US011386140B2

(12) United States Patent
Tang et al.

(10) Patent No.: US 11,386,140 B2
(45) Date of Patent: Jul. 12, 2022

(54) STORY ALBUM DISPLAY METHOD AND APPARATUS

(71) Applicant: Huawei Technologies Co., Ltd., Shenzhen (CN)

(72) Inventors: ZhongLiang Tang, Shanghai (CN); Hua Jiang, Nanjing (CN); Tangsuo Li, Nanjing (CN); Shaojun Chen, Shanghai (CN); Mingliang Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/769,849

(22) PCT Filed: Dec. 5, 2017

(86) PCT No.: PCT/CN2017/114607
§ 371 (c)(1),
(2) Date: Jun. 4, 2020

(87) PCT Pub. No.: WO2019/109245
PCT Pub. Date: Jun. 13, 2019

(65) Prior Publication Data
US 2021/0011940 A1  Jan. 14, 2021

(51) Int. Cl.
*G06F 16/438* (2019.01)
*G06F 16/55* (2019.01)
(Continued)

(52) U.S. Cl.
CPC ........ *G06F 16/4393* (2019.01); *G06F 16/535* (2019.01); *G06F 16/54* (2019.01); *G06F 16/55* (2019.01); *G06F 16/587* (2019.01)

(58) Field of Classification Search
CPC .... G06F 16/4393; G06F 16/55; G06F 16/587; G06F 16/535; G06F 16/54
(Continued)

(56) References Cited

U.S. PATENT DOCUMENTS 6,389,181 B2   5/2002 Shaffer et al.
7,614,837 B2  11/2009 Anderson et al.
(Continued)

FOREIGN PATENT DOCUMENTS

CN   101740086 A   6/2010
CN   102158628 A   8/2011
(Continued)

OTHER PUBLICATIONS

Haiyun, Q., et al., "Design and Implementation of Photo Album Based on Android," South China University of Technology, Nov. 19, 2013, 78 pages.
(Continued)

*Primary Examiner* — Kimberly L Wilson
(74) *Attorney, Agent, or Firm* — Conley Rose, P.C.

(57) ABSTRACT

A story album display method and apparatus, and relate to the field of communications technologies, so that a thematic story album can be generated. The method includes: aggregating, by a terminal, N images in a gallery based on a first dimension, where the first dimension includes a photographing time and/or a photographing location, and N>1; and removing, by the terminal, an invalid image from the N images, to obtain the story album comprising the M images, wherein the invalid image comprises an image with an invalid label, or one or more images with an image similarity greater than a threshold; and displaying, by the terminal, an album cover of a story album, where the story album includes M images in the N images, the M images are associated with a theme of the story album, and M<N.

18 Claims, 28 Drawing Sheets

(51) Int. Cl.
*G06F 16/587* (2019.01)
*G06F 16/535* (2019.01)
*G06F 16/54* (2019.01)

(58) Field of Classification Search
USPC .......................................................... 707/769
See application file for complete search history.

(56) References Cited

U.S. PATENT DOCUMENTS

| | | | |
|---|---|---|---|
| 8,611,677 | B2 | 12/2013 | Das et al. |
| 8,886,576 | B1 | 11/2014 | Sanketi et al. |
| 8,923,551 | B1* | 12/2014 | Grosz ................ H04N 1/00196 |
| | | | 382/100 |
| 9,244,941 | B2 | 1/2016 | Chen et al. |
| 9,411,831 | B2 | 8/2016 | Baldwin et al. |
| 2006/0221779 | A1 | 10/2006 | Matsushita et al. |
| 2008/0304755 | A1 | 12/2008 | Xiao et al. |
| 2009/0225191 | A1 | 9/2009 | Tachikawa et al. |
| 2010/0121852 | A1 | 5/2010 | Kim |
| 2012/0027293 | A1* | 2/2012 | Cok .................... G06F 16/4393 |
| | | | 382/164 |
| 2012/0170856 | A1 | 7/2012 | Yamaguchi |
| 2016/0110355 | A1 | 4/2016 | Charania et al. |
| 2016/0196478 | A1* | 7/2016 | Choi ................... G06F 16/2255 |
| | | | 382/218 |
| 2016/0239519 | A1* | 8/2016 | Levy ....................... G06T 5/003 |
| 2016/0291906 | A1 | 10/2016 | Kobayashi |
| 2016/0358042 | A1 | 12/2016 | Fu et al. |
| 2017/0177942 | A1 | 6/2017 | Rao et al. |
| 2017/0192625 | A1 | 7/2017 | Kim et al. |
| 2017/0351417 | A1* | 12/2017 | Manico ................... G06F 16/50 |
| 2018/0068019 | A1* | 3/2018 | Novikoff ............... G06F 16/783 |
| 2019/0095463 | A1* | 3/2019 | Moussaffi ............. G06F 16/583 |

FOREIGN PATENT DOCUMENTS

| | | |
|---|---|---|
| CN | 102549579 A | 7/2012 |
| CN | 103369031 A | 10/2013 |
| CN | 103838484 A | 6/2014 |
| CN | 104331509 A | 2/2015 |
| CN | 104866501 A | 8/2015 |
| CN | 104933146 A | 9/2015 |
| CN | 105022802 A | 11/2015 |
| CN | 105528444 A | 4/2016 |
| CN | 105528450 A | 4/2016 |
| CN | 105955995 A | 9/2016 |
| CN | 106021573 A | 10/2016 |
| CN | 106055554 A | 10/2016 |
| CN | 106055624 A | 10/2016 |
| CN | 106202392 A | 12/2016 |
| CN | 106326908 A | 1/2017 |
| CN | 106446950 A | 2/2017 |
| CN | 106776821 A | 5/2017 |
| CN | 107193941 A | 9/2017 |
| CN | 107341710 A | 11/2017 |
| CN | 107357815 A | 11/2017 |
| CN | 107408212 A | 11/2017 |
| EP | 2187322 A1 | 5/2010 |
| WO | 2010119548 A1 | 10/2010 |

OTHER PUBLICATIONS

Arase, Y., et al., "Mining People s Trips from Large Scale Geo-tagged Photos," Proceedings of the 18th ACM international conference on Multimedia, Oct. 2010, 10 pages.

* cited by examiner

STORY ALBUM DISPLAY METHOD AND APPARATUS

CROSS-REFERENCE TO RELATED APPLICATIONS

This application is a National Stage of International Patent Application No. PCT/CN2017/114607 filed on Dec. 5, 2017, which is hereby incorporated by reference in its entirety.

TECHNICAL FIELD

Embodiments of this application relate to the field of communications technologies, and in particular, to a story album display method and apparatus.

BACKGROUND

A story album (story album) function is as follows: A terminal automatically aggregates images in a gallery to make one or more story albums, so that a user can quickly and conveniently review photos of some past important events.

Currently, the terminal may aggregate, based on a photographing location or a photographing time of each image in the gallery, photos that are photographed within a specific time period or at a specific location, and make a story album in a form of a short video. For example, photos that are photographed from Nov. 4, 2017 to Nov. 5, 2017 in Yanqing district are aggregated to make a story album A. As shown in FIG. 1, one photo may be selected from the story album A as an album cover 11 of the story album A, and the album cover 11 may display description information 12 used to reflect features of all the photos in the story album A.

Because the story album A is obtained through aggregation based on a photographing location or a photographing time, the description information 12 is usually used to reflect specific photographing location information or specific photographing time information. However, as a quantity of images in the gallery increases, it is increasingly difficult to search, by using only a photographing location or a photographing time, the gallery for a valuable image that interests the user. If the user forgets an accurate time or location, it is difficult and time-consuming to search the gallery for a large quantity of images. Consequently, efficiency with which the terminal manages an image in the gallery is reduced.

SUMMARY

Embodiments of this application provide a story album display method and apparatus, so that a thematic story album can be generated. Therefore, this improves efficiency with which a terminal manages an image in a gallery.

To achieve the foregoing objective, the following technical solutions are used in the embodiments of this application.

According to a first aspect, an embodiment of this application provides a story album display method, including: aggregating, by a terminal, N (N>1) images in a gallery based on a first dimension (the first dimension includes a photographing time and/or a photographing location); and displaying, by the terminal, an album cover of a story album, where the story album includes M (M<N) images in the N images, and the M images are associated with a theme of the story album.

In other words, after aggregating the N images in the gallery based on the photographing time and/or the photographing location, the terminal may obtain the M thematic images from the N images through screening, to create the story album including the M images and display the story album to a user. In this way, a generated story album is distinctly thematic, and the user may select a required image from a corresponding story album based on a theme. Therefore, this improves efficiency with which the terminal subsequently manages an image in the gallery.

For example, the theme of the story album may specifically include at least one of "birthday", "party", "wedding", "sports", "graduation", "holiday", "night scene", "local travel", and "non-local travel".

In a possible design method, the album cover includes a title of the story album, and the title is associated with at least one of the determined theme, a photographing time of the N images, and a photographing location of the N images. Therefore, the user learns of basic information of an image in the story album in a timely manner based on the title displayed on the album cover.

In a possible design method, after the aggregating, by a terminal, N images in a gallery based on a first dimension, the method further includes: removing, by the terminal, an invalid image from the N images, to obtain the story album including the M images, where the invalid image includes an image with an invalid label, or one or more images with an image similarity greater than a threshold. In other words, the terminal may remove, from an initial story album, an invalid image that does not conform to the theme, so that the images in the created story album are strongly associated with each other.

In a possible design method, after the removing, by the terminal, an invalid image from the N images, to obtain the story album including the M images, the method further includes: determining, by the terminal based on a second dimension, a theme associated with the M images, to obtain the theme of the story album, where the second dimension includes an image feature of at least one of the M images.

In other words, on the basis of the N images that are aggregated by the terminal based on the first dimension, the terminal may further identify a theme scenario of the N images based on a specific image feature of each image. To be specific, the terminal identifies image content in an image feature dimension (which is referred to as a second dimension in this embodiment of this application), to determine a theme scenario of the story album, so that the terminal implements multi-dimensional image understanding when creating the story album. In this way, the terminal can identify a distinctly thematic story album generated through theme scenario-centric aggregation. Therefore, this improves efficiency with which the terminal manages an image in the gallery.

In a possible design method, after the determining, by the terminal based on a second dimension, the theme that is of the story album and that is associated with the M images, the method further includes: modifying, by the terminal, the theme of the story album based on a third dimension, where the third dimension includes association information that is in a target application and that is associated with the theme of the story album.

It can be learned that, in this embodiment of this application, the terminal may process an image in the gallery in three dimensions: attribute information of the image, an image feature of the image, and a target application associated with the image, to identify a theme scenario of the image in the gallery. Therefore, strongly thematic images are aggregated into a story album, to create a thematic story album that strongly interests the user or that is highly valuable to the user.

In a possible design method, the first dimension includes the photographing time; and the aggregating, by a terminal, N images in a gallery based on a first dimension includes: aggregating, by the terminal, images generated within each of Z time periods into one image set, to obtain Z image sets, where the Z image sets are in a one-to-one correspondence with the Z time periods, and Z≥2; and when a time interval between adjacent image sets is less than an interval threshold, aggregating, by the terminal, the adjacent image sets.

In a possible design method, the first dimension further includes the photographing location. When a photographing location of adjacent image sets is not a preset location, it indicates that the user is very likely to have a long trip in a non-resident place. In this case, the interval threshold may be set to a first preset value that is higher. However, when a photographing location of adjacent image sets is a preset location, the interval threshold may be set to a second preset value that is smaller, so that continuously photographed images are aggregated together to create a story album.

In a possible design method, the determining, by the terminal based on a second dimension, a theme associated with the M images, to obtain the theme of the story album includes: comparing, by the terminal, a label distribution status of the M images with a preset label distribution status of each candidate theme; and when the label distribution status of the M images meets a label distribution status of a first candidate theme, determining, by the terminal, the first candidate theme as the theme of the story album.

In a possible design method, the removing, by the terminal, an invalid image from the N images includes: displaying, by the terminal, X images with a similarity greater than the threshold that are identified from the N images, where X≥2; and in response to a target image selected by a user from the X images, retaining, by the terminal, the target image in the story album, and removing a remaining image from the X images other than the target image.

In a possible design method, the removing, by the terminal, an invalid image from the story album includes: displaying, by the terminal, Y labels identified from the N images, where a label of each image is used to reflect an image feature of the image, and Y≥2; and in response to a target label selected by the user from the Y labels, retaining, by the terminal, an image with the target label in the story album, and removing an image without the target label.

In a possible design method, after the displaying, by the terminal, an album cover of a story album, the method further includes: playing, by the terminal, the story album, where when playing a first image in the story album, the terminal displays a photographing time and/or a photographing location of the first image. In this way, in a process of playing a story album, this can help the user quickly recall information related to a currently played image. Therefore, this improves user experience when the user uses the story album.

In a possible design method, the first dimension further includes at least one of a person that appears in the story album, playing duration of the story album, a quantity of images in the story album, and the theme of the story album. Before the aggregating, by a terminal, N images in a gallery based on a first dimension, the method further includes: receiving, by the terminal, at least one of a target time period, a target photographing location, a target person, target playing duration, a quantity of target images, and a target theme that are entered by the user for a to-be-created story album.

In other words, the terminal may prompt the user to select one or more conditions such as an album theme, an included person, a photographing time, a photographing location, playing duration, and a quantity of images of a story album, and obtain a related image through screening based on the condition selected by the user, to create the story album that is expected by the user.

According to a second aspect, an embodiment of this application provides a story album display method, including: receiving, by a terminal, schedule information that is entered by a user into a target application; creating, by the terminal, a story album by aggregating N (N>1) images in a gallery; and displaying, by the terminal, an album cover of the story album, where a title on the album cover is associated with the schedule information. In this way, a thematic story album that strongly interests the user or that is highly valuable to the user can be created.

In a possible design method, the target application includes at least one of Reminders, Calendar, Email, Notepad, Phone, Messaging, and Contacts.

According to a third aspect, an embodiment of this application provides a terminal, including: an aggregation unit, configured to aggregate N images in a gallery based on a first dimension, where the first dimension includes a photographing time and/or a photographing location, and N>1; and a display unit, configured to display an album cover of a story album, where the story album includes M images in the N images, the M images are associated with a theme of the story album, and M<N.

In a possible design method, the terminal further includes a removing unit, configured to remove an invalid image from the N images, to obtain the story album including the M images, where the invalid image includes an image with an invalid label, or one or more images with an image similarity greater than a threshold.

In a possible design method, the terminal further includes a determining unit, configured to determine, based on a second dimension, a theme associated with the M images, to obtain the theme of the story album, where the second dimension includes an image feature of at least one of the M images.

In a possible design method, the terminal further includes a modification unit, configured to modify the theme of the story album based on a third dimension, where the third dimension includes association information that is in a target application and that is associated with the theme of the story album.

In a possible design method, the first dimension includes the photographing time; and the aggregation unit is specifically configured to: aggregate images generated within each of Z time periods into one image set, to obtain Z image sets, where the Z image sets are in a one-to-one correspondence with the Z time periods, and Z≥2; and when a time interval between adjacent image sets is less than an interval threshold, aggregate the adjacent image sets.

In a possible design method, the first dimension further includes the photographing location, and when a photographing location of adjacent image sets is not a preset location, the interval threshold is a first preset value; or when a photographing location of adjacent image sets is a preset location, the interval threshold is a second preset value, where the second preset value is less than the first preset value.

In a possible design method, the determining unit is specifically configured to: compare a label distribution status of the M images with a preset label distribution status of each candidate theme; and when the label distribution status of the M images meets a label distribution status of a first candidate theme, determine the first candidate theme as the theme of the story album.

In a possible design method, the display unit is further configured to display X images with a similarity greater than the threshold that are identified from the N images, where X≥2; and the removing unit is specifically configured to: in response to a target image selected by a user from the X images, retain the target image in the story album, and remove a remaining image from the X images other than the target image.

In a possible design method, the display unit is further configured to display Y labels identified from the N images, where a label of each image is used to reflect an image feature of the image, and Y≥2; and the removing unit is specifically configured to: in response to a target label selected by the user from the Y labels, retain an image with the target label in the story album, and remove an image without the target label.

In a possible design method, the display unit is further configured to play the story album, where when playing a first image in the story album, the terminal displays a photographing time and/or a photographing location of the first image.

In a possible design method, the first dimension further includes at least one of a person that appears in the story album, playing duration of the story album, a quantity of images in the story album, and the theme of the story album; and the terminal further includes an obtaining unit, configured to receive at least one of a target time period, a target photographing location, a target person, target playing duration, a quantity of target images, and a target theme that are entered by the user for a to-be-created story album.

According to a fourth aspect, an embodiment of this application provides a terminal, including: an obtaining unit, configured to receive schedule information that is entered by a user into a target application; a creation unit, configured to create a story album by aggregating N images in a gallery, where N>1; and a display unit, configured to display an album cover of the story album, where the album cover includes a title of the story album, and the title is associated with the schedule information.

According to a fifth aspect, an embodiment of this application provides a terminal, including a processor, a memory, a bus, and a communications interface. The memory is configured to store a computer-executable instruction. The processor and the memory are connected by using the bus. When the terminal runs, the processor executes the computer-executable instruction stored in the memory, so that the terminal performs the story album display method according to the first aspect or the second aspect.

According to a sixth aspect, an embodiment of this application provides a computer readable storage medium. The computer readable storage medium stores an instruction, and when the instruction is run on the terminal according to the fourth aspect or the fifth aspect, the terminal is enabled to perform the story album display method according to the first aspect or the second aspect.

According to a seventh aspect, an embodiment of this application provides a computer program product including an instruction. When the computer program product is run on the terminal according to the fourth aspect or the fifth aspect, the terminal is enabled to perform the story album display method according to the first aspect or the second aspect.

In the embodiments of this application, names of the foregoing terminals constitute no limitation on the devices. During actual implementation, these devices may have other names, provided that functions of the devices are similar to those in the embodiments of this application, that is, fall within the scope of the claims of this application and the equivalent technologies thereof.

In addition, for technical effects brought by any design manner in the second aspect to the seventh aspect, refer to technical effects brought by different design methods in the first aspect. Details are not described herein again.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more than two.

A story album display method provided in the embodiments of this application may be applied to any terminal having a display function, for example, a mobile phone, a tablet computer, a wearable device, an augmented reality (augmented reality, AR) device/a virtual reality (virtual reality, VR) device, a notebook computer, an ultra-mobile personal computer (ultra-mobile personal computer, UMPC), a netbook, a personal digital assistant (personal digital assistant, PDA), or a vehicle-mounted device. This is not limited in the embodiments of this application.

Figure 1:
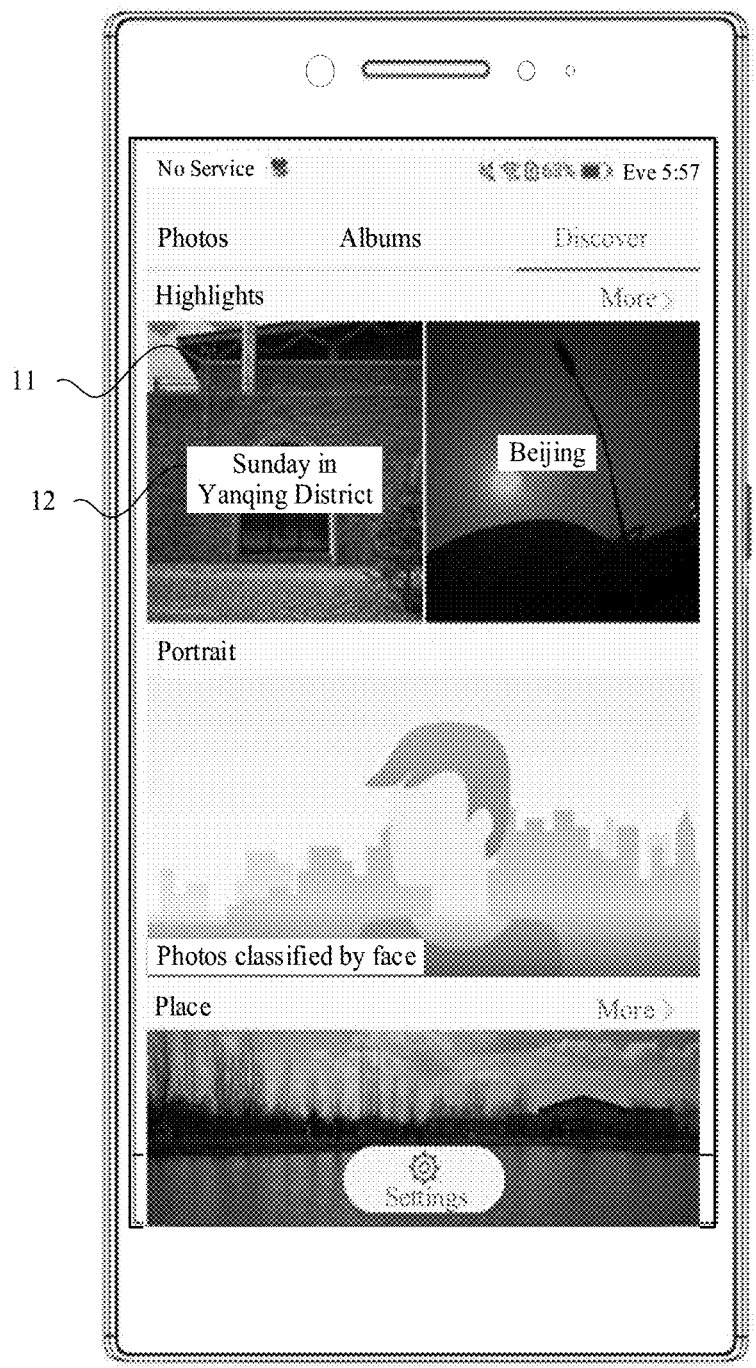
FIG. 1 is an application scenario of displaying a story album in the prior art.
Figure 2:
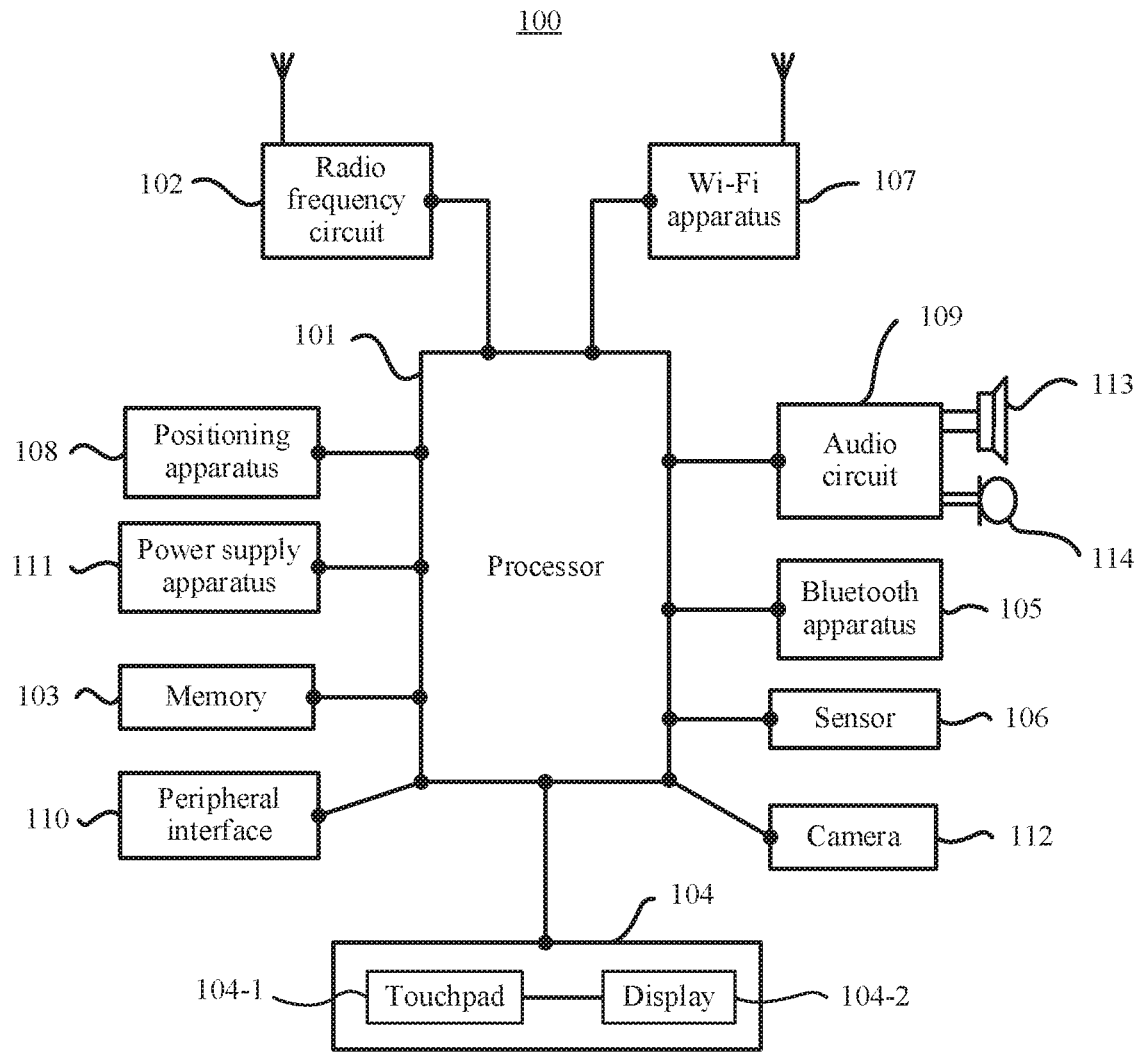
FIG. 2 is a schematic structural diagram 1 of a terminal according to an embodiment of this application.

As shown in FIG. 2, a terminal in the embodiments of this application may be a mobile phone 100. The mobile phone 100 is used as an example below to describe the embodiments in detail. It should be understood that the mobile phone 100 shown in the figure is merely an example of the foregoing terminal, and the mobile phone 100 may have more or fewer components than those shown in the figure, or may combine two or more components, or may have different component configurations.

As shown in FIG. 2, the mobile phone 110 may specifically include components such as a processor 101, a radio frequency (radio frequency, RF) circuit 102, a memory 103, a touchscreen 104, a Bluetooth apparatus 105, one or more sensors 106, a wireless fidelity (wireless-fidelity, Wi-Fi) apparatus 107, a positioning apparatus 108, an audio circuit 109, a peripheral interface 110, and a power supply system 111. These components may communicate with each other by using one or more communications buses or signal lines (not shown in FIG. 2). A person skilled in the art may understand that a hardware structure shown in FIG. 2 does not constitute any limitation on the mobile phone. The mobile phone 110 may include more or fewer components than those shown in the figure, or may combine some components, or may have different component arrangements.

The following describes the components of the mobile phone 110 in detail with reference to FIG. 2.

The processor 101 is a control center of the mobile phone 110. The processor 101 is connected to parts of the mobile phone 110 by using various interfaces and lines, runs or executes an application program stored in the memory 103, and invokes data stored in the memory 103, to perform various functions of the mobile phone 110 and data processing. In some embodiments, the processor 101 may include one or more processing units. For example, the processor 101 may be a Kirin 960 chip manufactured by Huawei Technologies Co., Ltd, or may be a Qualcomm Snapdragon 820 chip. In some embodiments of this application, the processor 101 may further include a fingerprint verification chip, configured to verify a collected fingerprint.

The radio frequency circuit 102 may be configured to receive and send a radio signal in an information receiving and sending process or in a call process. Particularly, after receiving downlink data from a base station, the radio frequency circuit 102 may send the downlink data to the processor 101 for processing, and send related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, an SMS message service, and the like.

The memory 103 is configured to store the application program and the data. The processor 101 runs the application program and the data stored in the memory 103, to perform various functions of the mobile phone 110 and data processing. The memory 103 mainly includes a program storage area and a data storage area. The program storage area may store an operating system, and an application program required by at least one function (for example, a sound playing function or an image playing function). The data storage area may store data (for example, audio data or an address book) created when the mobile phone 110 is used. In addition, the memory 103 may include a high-speed random access memory (random access memory, RAM), or may include a nonvolatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent and is connected to the processor 101 by using the foregoing communications bus; or the memory 103 may be integrated with the processor 101.

The touchscreen 104 may specifically include a touchpad 104-1 and a display 104-2.

The touchpad 104-1 may collect a touch event performed by a user of the mobile phone 110 on or near the touchpad 104-1 (for example, an operation performed by the user on the touchpad 104-1 or near the touchpad 104-1 by using any proper object such as a finger or a stylus), and send collected touch information to another component (for example, the processor 101). The touch event performed by the user near the touchpad 104-1 may be referred to as a floating touch. The floating touch may mean that the user does not need to directly touch the touchpad for selecting, moving, or dragging an object (for example, an icon), and the user only needs to be near the terminal to execute an expected function. In addition, the touchpad 104-1 may be implemented in a plurality of types such as a resistive type, a capacitive type, an infrared type, and a surface acoustic wave type.

The display (may also be referred to as a display screen) 104-2 may be configured to display information that is entered by the user or information that is provided for the user, and various menus of the mobile phone 110. The display 104-2 may be configured in a form of a liquid crystal display, an organic light emitting diode, or the like. The touchpad 104-1 may cover the display 104-2. After detecting the touch event performed on or near the touchpad 104-1, the touchpad 104-1 transfers the touch event to the processor 101 to determine a type of the touch event. Then, the processor 101 may provide a corresponding visual output on the display 104-2 based on the type of the touch event. Although in FIG. 2, the touchpad 104-1 and the display 104-2 are used as two independent components to implement input and output functions of the mobile phone 110, in some embodiments, the touchpad 104-1 and the display 104-2 may be integrated to implement the input and output functions of the mobile phone 110.

It can be understood that the touchscreen 104 is formed by stacking a plurality of layers of materials. In this embodiment of this application, only the touchpad (layer) and the display screen (layer) are displayed, and another layer is not recorded in this embodiment of this application. In addition, the touchpad 104-1 may be disposed on a front side of the mobile phone 110 in a full panel form, and the display 104-2 may also be disposed on the front side of the mobile phone 110 in a full panel form. In this way, a bezel-less structure can be implemented for the front side of the mobile phone.

The mobile phone 110 may further include the Bluetooth apparatus 105, configured to exchange data between the mobile phone 110 and another terminal (for example, a mobile phone or a smartwatch) at a short distance from the mobile phone 110. In this embodiment of this application, the Bluetooth apparatus may be an integrated circuit, a Bluetooth chip, or the like.

The mobile phone 110 may further include the at least one sensor 106, such as a fingerprint collection component, a light sensor, a motion sensor, and another sensor. Specifically, the fingerprint collection component may be disposed on a back side of the mobile phone 110 (for example, at a lower part of a rear-facing camera), or the fingerprint collection component may be disposed on the front side of the mobile phone 110 (for example, at a lower part of the touchscreen 104). For another example, the fingerprint collection component may be disposed on the touchscreen 104 to implement a fingerprint recognition function. In other words, the fingerprint collection component may be integrated with the touchscreen 104 to implement the fingerprint recognition function of the mobile phone 110. The light sensor may include an ambient light sensor and a proximity sensor. The ambient light sensor may adjust luminance of the display of the touchscreen 104 based on luminance of ambient light, and the proximity sensor may power off the display when the mobile phone 110 is moved to an ear. As a type of motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (for example, switching between a landscape mode and a portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured in the mobile phone 110. Details are not described herein.

The Wi-Fi apparatus 107 is configured to provide the mobile phone 110 with network access that complies with a Wi-Fi related standard protocol. The mobile phone 110 may access a Wi-Fi access point by using the Wi-Fi apparatus 107, to help the user receive and send an email, browse a web page, access streaming media, and the like. The Wi-Fi apparatus 107 provides wireless broadband internet access for the user. In some other embodiments, the Wi-Fi apparatus 107 may be used as a Wi-Fi wireless access point, and may provide Wi-Fi network access for another terminal.

The positioning apparatus 108 is configured to provide a geographical location for the mobile phone 110. It can be understood that the positioning apparatus 108 may be specifically a receiver of a positioning system such as a global positioning system (global positioning system, GPS), a BeiDou navigation satellite system, or a Russian GLO-NASS. After receiving the geographical location sent by the foregoing positioning system, the positioning apparatus 108 sends the information to the processor 101 for processing, or sends the information to the memory 103 for storage. In some other embodiments, the positioning apparatus 108 may alternatively be a receiver of an assisted global positioning system (assisted global positioning system, AGPS), and the AGPS system serves as an assisted server to assist the positioning apparatus 108 in completing ranging and positioning services. In this case, the assisted positioning server communicates with the terminal such as the positioning apparatus 108 (namely, a GPS receiver) of the mobile phone 110 through a wireless communications network, to provide positioning assistance. In some other embodiments, the positioning apparatus 108 may alternatively be a positioning technology that is based on a Wi-Fi access point. Each Wi-Fi access point has a globally unique media access control (media access control, MAC) address, and the terminal can scan and collect a broadcast signal of a nearby Wi-Fi access point when the terminal enables Wi-Fi. Therefore, a MAC address that is broadcast by the Wi-Fi access point can be obtained. The terminal sends, to a location server through the wireless communications network, data (for example, the MAC address) that can identify the Wi-Fi access point. The location server obtains a geographical location of each Wi-Fi access point through retrieving, calculates a geographical location of the terminal and sends the geographical location to the positioning apparatus 108 of the terminal with reference to a strength of a Wi-Fi broadcast signal.

The audio circuit 109, a speaker 113, and a microphone 114 may provide an audio interface between the user and the mobile phone 110. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and outputs the audio data to the RF circuit 102 to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the terminal is connected to the mouse through a universal serial bus (universal serial bus, USB) interface. By using a metal contact on a card slot of a subscriber identification module (subscriber identification module, SIM) card provided by a telecommunications operator, the terminal is connected to the subscriber identification module card. The peripheral interface 110 may be configured to couple the foregoing external input/output peripheral device to the processor 101 and the memory 103.

The mobile phone 110 may further include the power supply apparatus 111 (for example, a battery and a power management chip) that supplies power to the components, and the battery may be logically connected to the processor 101 by using the power management chip, so that functions such as charging management, discharging management, and power consumption management are implemented by using the power supply apparatus 111.

As shown in FIG. 2, the mobile phone 110 may further include a camera 112. The camera 112 may be a front-facing camera or a rear-facing camera. This is not limited in this embodiment of this application.

Figure 3:
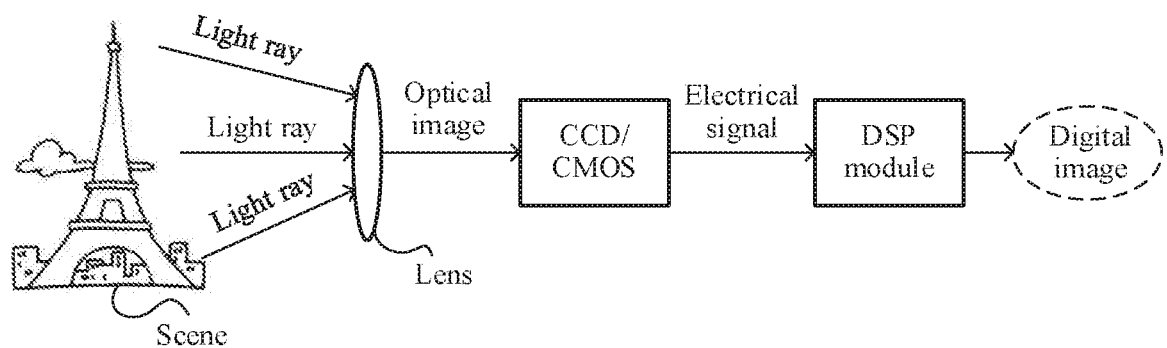
FIG. 3 is a schematic diagram of a photographing principle of a camera according to an embodiment of this application.

Specifically, as shown in FIG. 3, the camera 112 generally includes a lens (lens) and an image sensor (sensor). The image sensor may be any photosensitive component such as a CCD (Charge-coupled Device, charge coupled device) or a CMOS (Complementary Metal Oxide Semiconductor, complementary metal-oxide-semiconductor).

In a photographing process, an optical image is generated after reflected light rays of a scene pass through the lens, the optical image is projected onto the image sensor, the image sensor converts a received optical signal into an electrical signal, the camera 112 further sends the obtained electrical signal to a DSP (Digital Signal Processing, digital signal processing) module for digital signal processing, and finally a digital image is obtained. The digital image may be output on the mobile phone 100 by using the display 104-2, or the digital image may be stored in the memory 103.

The DSP module may be integrated into the processor 101 in a form of a function module, or may be independently disposed in the mobile phone 100 in a form of a chip. This is not limited in this embodiment of this application.

For example, the digital image generated by the DSP module may be stored in the memory 103 in an exchangeable image file (exchangeable image file, EXIF) format.

Figure 4:
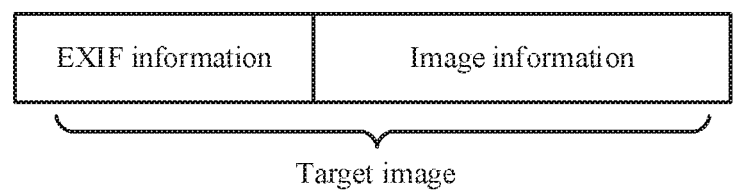
FIG. 4 is a schematic structural diagram of an image in an EXIF format according to an embodiment of this application.

As shown in FIG. 4, a target image in an EXIF format may include image information and EXIF information. The image information includes information about each pixel in the target image, for example, a gray-scale value of the pixel. Some attribute information related to the target image is added to a header of the image information, for example, a time, a location, a shutter, an aperture, white balance, a photographic sensitivity, a focal length, a camera and/or a lens brand and model for photographing the target image. In this embodiment of this application, the attribute information may be referred to as the EXIF information.

Specifically, when the processor 101 instructs the camera 112 to photograph the target image, the processor 101 uses a system time of the terminal as a photographing time, triggers a sensor such as the positioning apparatus 108 to obtain the EXIF information such as a photographing location of the terminal, adds the EXIF information to the header of the image information of the target image, and finally stores the EXIF information and the image information of the target image in the memory 103.

In this way, the processor 101 may obtain the attribute information of the target image such as the photographing time and the photographing location by reading the EXIF information of the target image. Therefore, when creating a story album for the user, the processor 101 may read EXIF information of each image in a gallery, and aggregate images generated within a specific time period and/or at a specific location, to make the story album by using the aggregated images and display the story album to the user.

When the made story album is displayed, a photographing time and/or a photographing location of the images in the story album may be displayed on an album cover of the story album through overlaying. This helps the user select a valuable story album or an interesting story album to view.

However, as a quantity of images in the gallery increases, it is increasingly difficult to search, by using only a photographing location or a photographing time, a story album for a valuable image that interests the user. If the user forgets an accurate time or location, it is difficult and time-consuming to search the story album for a specific image. Consequently, efficiency with which the terminal manages an image in the gallery is reduced.

Figure 5:
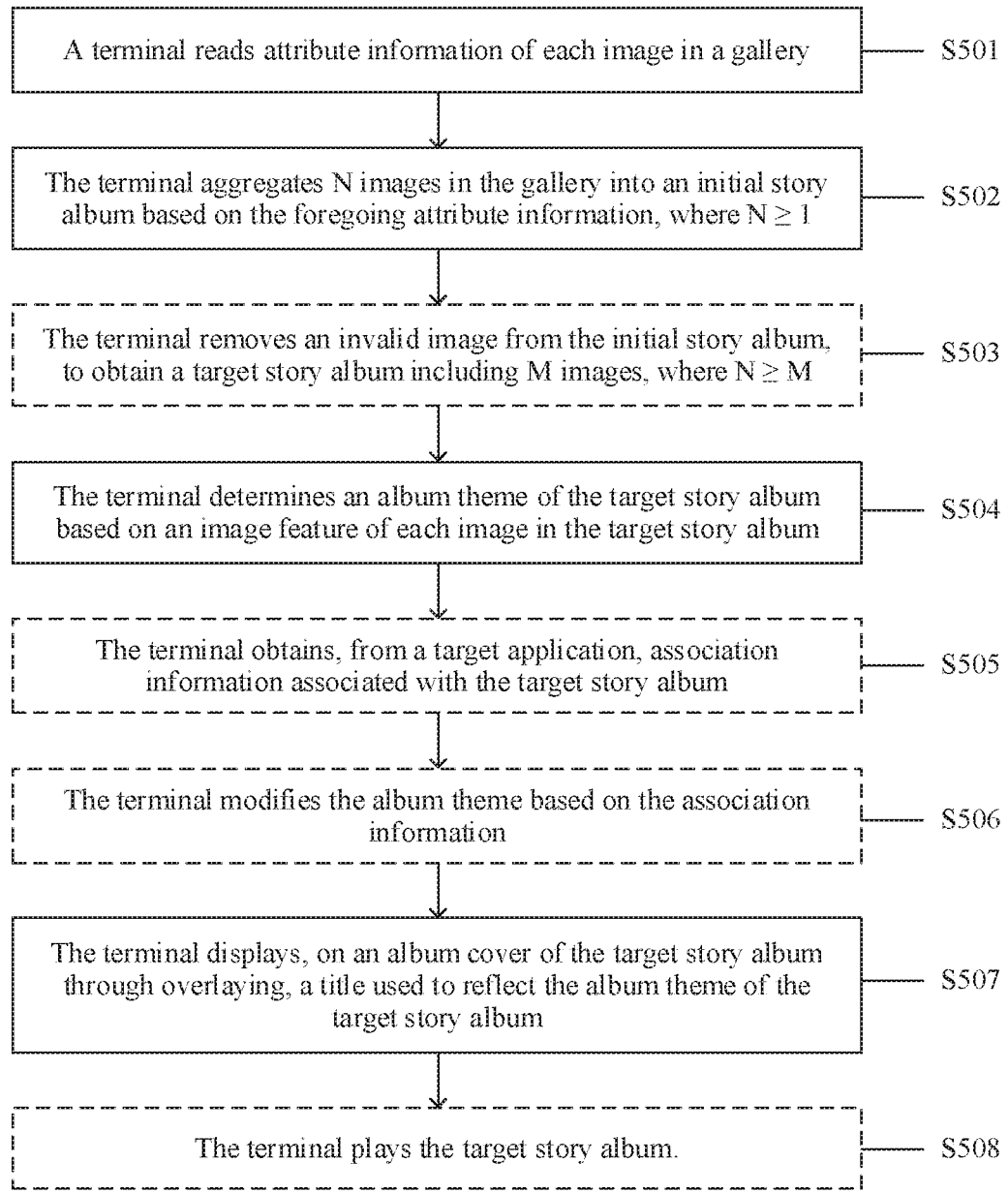
FIG. 5 is a schematic flowchart of a story album display method according to an embodiment of this application.

In view of this, an embodiment of this application provides a story album display method. As shown in FIG. 5, the method includes the following steps.

S501. A terminal reads attribute information of each image in a gallery.

An image in an EXIF format is used as an example. When a story album needs to be created, the terminal may read EXIF information of each of a plurality of images that have been stored in the gallery, to obtain attribute information of each image such as a photographing time and a photographing location from the EXIF information of each image.

Creation of one story album may be automatically triggered by the terminal without perception by a user. For example, the terminal may periodically and automatically create a story album for the user, or when a quantity of images added to the gallery within a time period is greater than a preset value, the terminal may be triggered to automatically create a story album.

Certainly, creation of one story album may be manually triggered by the user. For example, after entering the gallery of the terminal, the user may select a specific quantity of images, to further trigger the terminal to create a story album based on these images.

Figure 6:
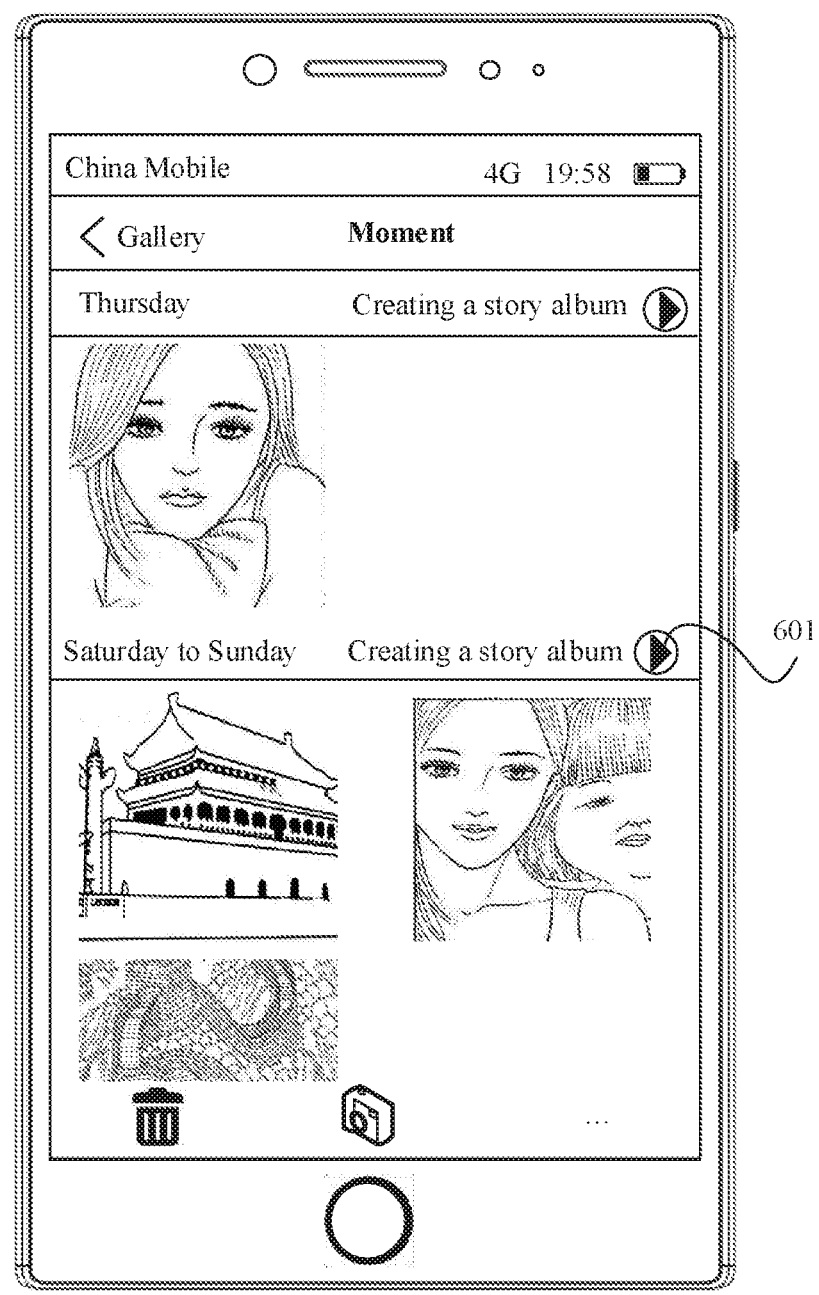
FIG. 6 is a schematic diagram 1 of a scenario of creating a story album according to an embodiment of this application.

For example, the terminal may display a thumbnail of the images in the gallery to the user in a time dimension. As shown in FIG. 6, when a thumbnail of images generated within a time period from Saturday to Sunday is displayed, a shortcut key 601 for creating a story album corresponding to the time period from Saturday to Sunday may be further set. Therefore, when it is detected that the user taps the shortcut key 601, the terminal may be triggered to read EXIF information of each image within the time period from Saturday to Sunday, to obtain attribute information of the image such as a photographing time and a photographing location.

S502. The terminal aggregates N images in the gallery into an initial story album based on the foregoing attribute information. Herein, N>1.

In a possible design method, the terminal may aggregate the N images in the gallery into the initial story album in a time dimension based on a photographing time in the foregoing attribute information. For example, the terminal aggregates images generated on November 4 and November 5 into an initial story album.

In another possible design method, the terminal may alternatively aggregate the N images in the gallery into the initial story album in a geographical location dimension based on a photographing location in the foregoing attribute information. For example, the terminal aggregates images generated in Chaoyang district in Beijing into an initial story album. For another example, the terminal may preset geographical location information of one or more locations, such as a residence place, a working place, a school, and a frequent place of the user. In this way, when the terminal determines that the foregoing photographing location is not the location that is preset by the user, the user may be on a business trip or travel. Therefore, the terminal may aggregate images photographed at a non-preset location into an initial story album.

Figure 7:
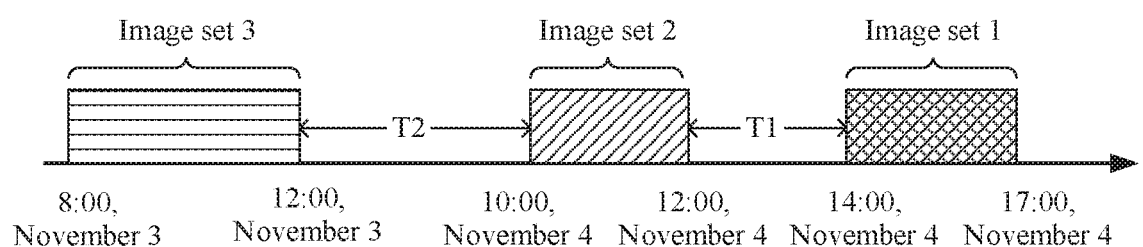
FIG. 7 is a schematic diagram 2 of a scenario of creating a story album according to an embodiment of this application.

In another possible design method, the terminal may first aggregate, based on a photographing time, a plurality of images generated within a short time period into a plurality of image sets. For example, as shown in FIG. 7, by using a density-based spatial clustering of applications with noise (density-based spatial clustering of applications, DBSCAN) algorithm, the terminal may aggregate K1 (K1≥1) images photographed on the afternoon of November 4 into an image set 1, aggregate K2 (K2≥1) images photographed on the morning of November 4 into an image set 2, and aggregate K3 (K3≥1) images photographed on the morning of November 3 into an image set 3. Further, the terminal may aggregate a plurality of image sets into an initial story album based on a time interval between every two adjacent image sets.

Still as shown in FIG. 7, if a time interval T1 between the image set 1 and the image set 2 is less than four hours, the terminal may aggregate the image set 1 and the image set 2 into an initial story album A; and if a time interval T2 between the image set 2 and the image set 3 is also less than four hours, the terminal may continue to aggregate the image set 1, the image set 2, and the image set 3 into an initial story album B. In this way, the terminal may obtain a to-be-created initial story album in a time dimension based on a photographing time interval between images in the gallery.

When the terminal aggregates the foregoing image sets based on the time interval between every two adjacent image sets, the terminal may further adjust a threshold of the foregoing time interval based on a photographing location of each image in the image sets.

Because the terminal presets the geographical location information of the location such as the residence place, the working place, the school, and the frequent place of the user. Therefore, when a photographing location of each image in two adjacent image sets is not one of the foregoing preset locations, it indicates that the user is very likely to have a long trip in a non-resident place. Therefore, the terminal may prolong the foregoing time interval to aggregate image sets.

Figure 8:
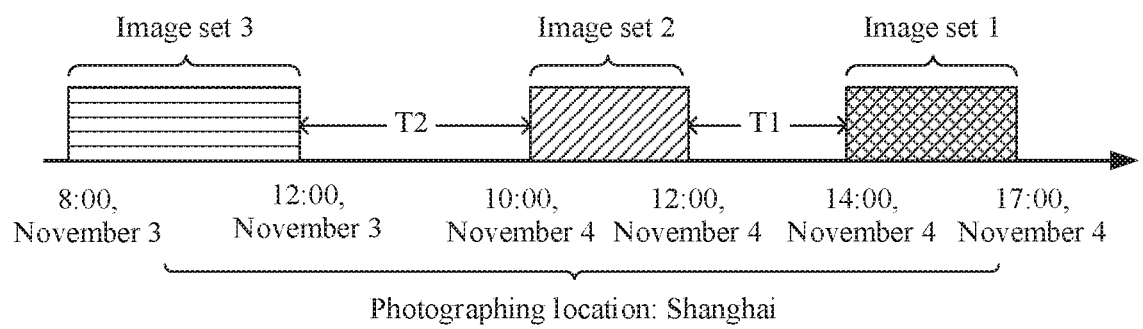
FIG. 8 is a schematic diagram 3 of a scenario of creating a story album according to an embodiment of this application.

As shown in FIG. 8, the image set 3 is photographed by the terminal in Shanghai on November 3, and both the image set 2 and the image set 1 are photographed by the terminal in Shanghai on November 4. However, a residence place that is preset by the user is Beijing. Therefore, the terminal may set the foregoing time interval threshold used for aggregation to two days, to further aggregate the image set 1, the image set 2, and the image set 3 into one initial story album, so that it is ensured that images generated when the user has a long trip in a non-local place can be aggregated into one album.

Figure 9A:
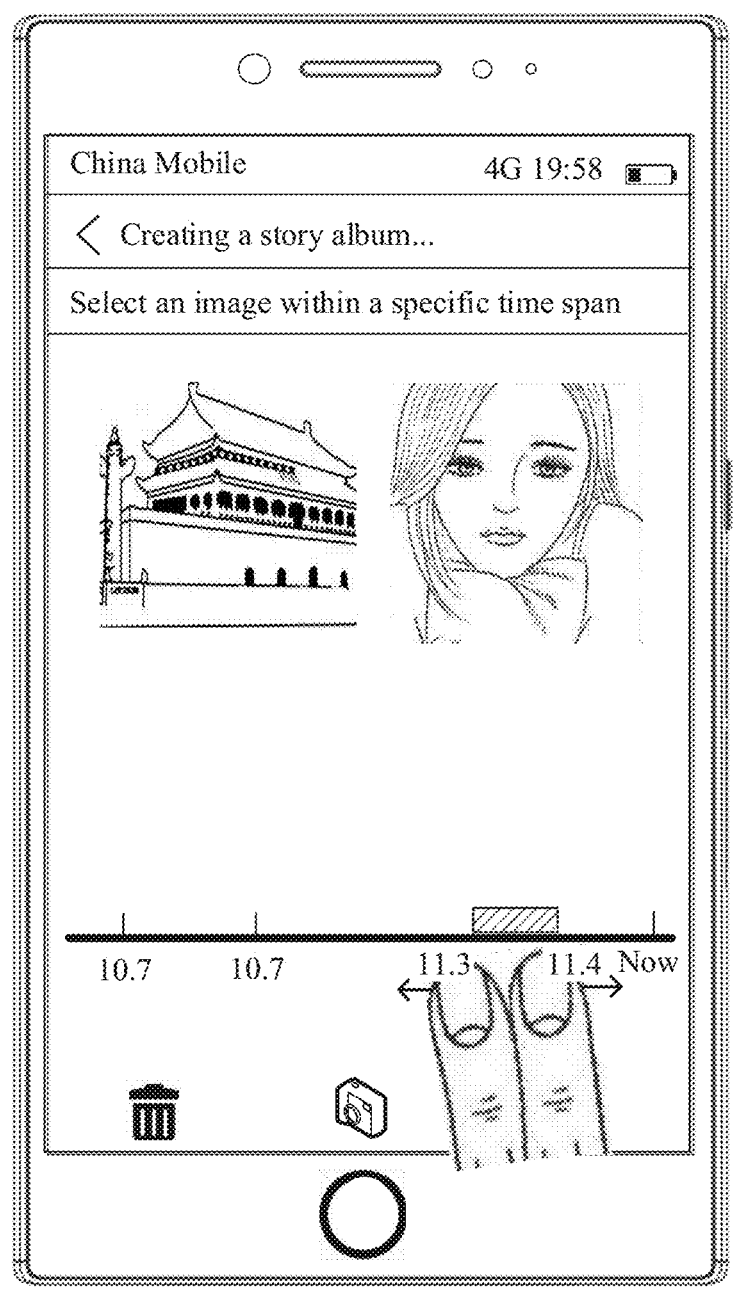
FIG. 9A is a schematic diagram 4 of a scenario of creating a story album according to an embodiment of this application.

Alternatively, the terminal may adjust the foregoing time interval threshold based on an input operation of the user. For example, as shown in FIG. 9A, when making a story album, the terminal may present a distribution status of images in the gallery on each time node to the user in a form of a progress bar. Therefore, the user may change a quantity of images in an initial story album by performing a gesture operation (for example, a pinch or point-tap selection operation) on the progress bar.

Figure 9B:
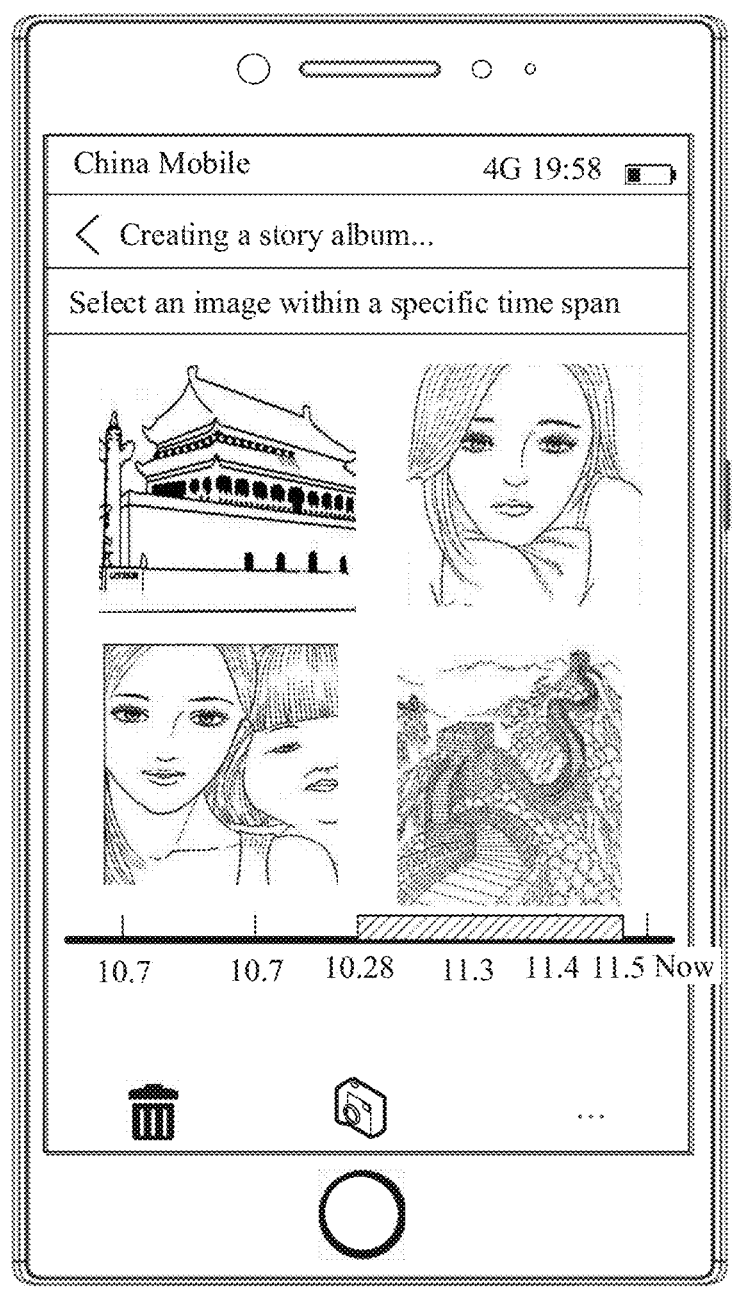
FIG. 9B is another a schematic diagram 4 of a scenario of creating a story album according to an embodiment of this application.

As shown in FIG. 9A, a default initial story album of the terminal includes only two images generated within a time period from November 3 to November 4, and the user may expand, by performing the pinch operation, a to-be-aggregated set of images photographed at different time points, in other words, manually prolong the time interval threshold used for aggregation. In this case, as shown in FIG. 9B, the user adjusts a time span of images in the initial story album from the time period from November 3 to November 4 to a time period from October 28 to November 5. In addition, the terminal may display, on a current display interface, a thumbnail of four images generated within the adjusted time span from October 28 to November 5. This helps the user determine whether the adjusted time span is suitable.

Figure 10:
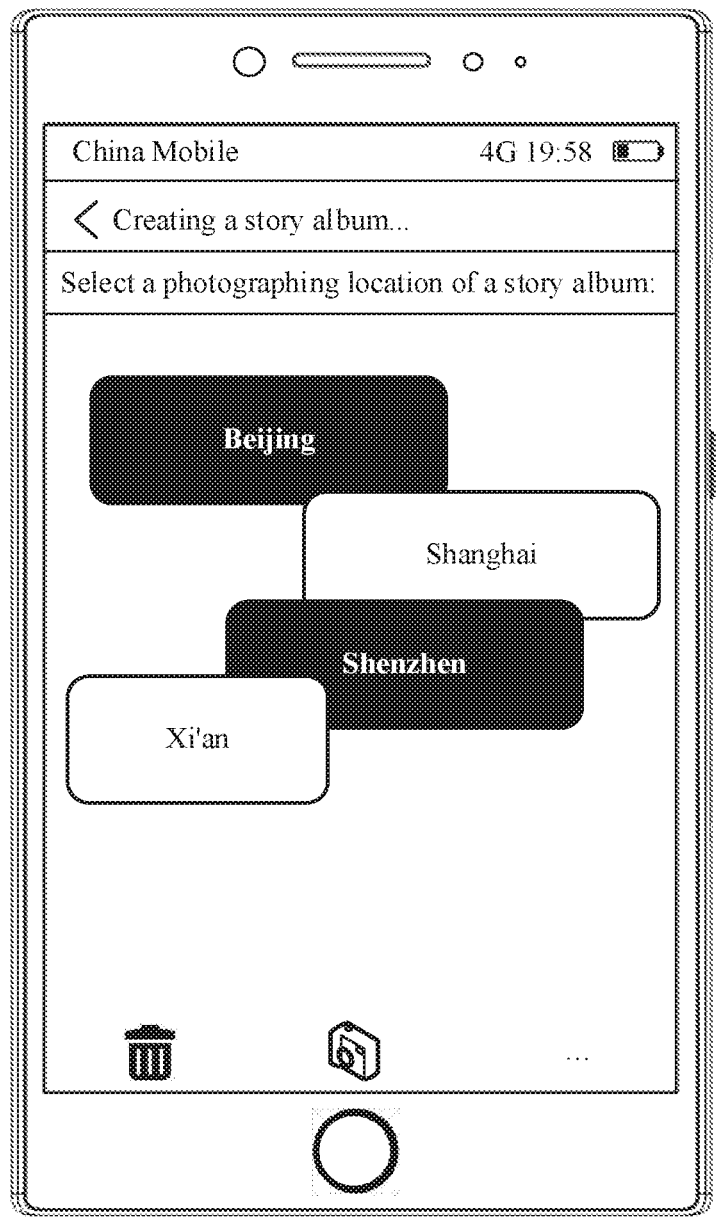
FIG. 10 is a schematic diagram 5 of a scenario of creating a story album according to an embodiment of this application.

Certainly, the terminal may alternatively select, based on an input operation of the user, to aggregate images photographed at different photographing locations into an initial story album. For example, as shown in FIG. 10, when making a story album, the terminal may display four read photographing locations: Beijing, Shanghai, Shenzhen, and Xi'an on a current display interface as candidate options, and the user may select one or more of the candidate options as a basis of creating an initial story album through aggregation. For example, if the user selects Beijing and Shenzhen from the four photographing locations, the terminal may aggregate, into an initial story album, images whose photographing locations in attribute information are Beijing or Shenzhen.

In other words, when creating a story album, the terminal may understand and aggregate images in the gallery in an attribute information dimension (which is referred to as a first dimension in this embodiment of this application) based on attribute information of an image such as a photographing time and/or a photographing location, to generate an initial story album created by using a photographing time and/or a photographing location as a constraint.

Certainly, there may be a plurality of manners in which the terminal creates an initial story album through aggregation based on a photographing time and/or a photographing location of an image, which may be set by a person skilled in the art based on an actual application scenario or actual experience. This is not limited in this embodiment of this application.

For example, after reading a photographing time of an image, the terminal may further identify whether the photographing time is a special day such as a holiday or an anniversary. For example, when a photographing time of an image 1 is October 1, the terminal may identify that the photographing time of the image 1 is in National Day holidays. Therefore, the terminal may aggregate N images photographed in the statutory holidays from October 1 to October 7 into an initial story album. For another example, when a photographing time of an image 2 is September 12, the terminal may identify that the photographing time of the image 2 is a birthday of the user. Therefore, the terminal may aggregate N images in the gallery that are photographed on September 12 of each year into an initial story album serving as a birthday image collection of the user.

The terminal may obtain, from an installed calendar application, the foregoing information such as a holiday, an anniversary, or a birthday recorded by the user. For example, the terminal reads a corresponding date in a holiday calendar or a birthday calendar. Details are not described herein.

Alternatively, after the terminal reads a photographing location of an image, if the terminal identifies that the photographing location is one of the locations that are preset by the user, for example, if a photographing location of an image 3 is the alma mater of the user, the terminal may aggregate N images in the gallery that are photographed at the alma mater at different times into an initial story album serving as an image collection of the user at the alma mater.

It can be learned that, in this embodiment of this application, after reading attribute information of an image such as a photographing time and/or a photographing location, the terminal may further understand the attribute information of the image. For example, the terminal identifies whether the photographing time of the image is a special day, and identifies whether the photographing location of the image is a preset location. Therefore, the terminal aggregates, in the first dimension related to the attribute information, images in the gallery based on an understanding result, to obtain an initial story album.

It should be noted that the foregoing embodiment is described by using only an example in which a photographing time and/or a photographing location are/is used as attribute information. It can be understood that the terminal may alternatively aggregate the N images in the gallery into the initial story album based on other image attributes in the read attribute information, such as a photographic sensitivity, a focal length, and a camera brand. This is not limited in this embodiment of this application.

S503 (optional). The terminal removes an invalid image from the initial story album, to obtain a target story album including M images, where N≥M.

Optionally, in step S503, the terminal may further perform screening on the images in the initial story album, and remove an image (namely, the invalid image) that is similar to or that is greatly different from another image in the initial story album, to obtain the target story album including the M images, so that the images in the created story album are strongly associated with each other. It should be noted that, when the terminal determines that there is no invalid image in the initial story album, a quantity M of images in the obtained target story album is equal to the quantity N of images in the initial story album.

In a possible design method, the terminal may identify content of each image in the initial story album. For example, the terminal identifies a hamming distance (hamming distance) between any two images by using pHash (perceptual hash algorithm). When a hamming distance between two images is less than a preset hamming distance threshold, the two images may be determined as similar images. In addition, the terminal may further adjust the hamming distance threshold based on a photographing time of an image. For example, when a photographing time interval between two images is relatively short (for example, within 10 seconds), a possibility that the two images are similar images is relatively high, and therefore the hamming distance threshold may be appropriately set to be larger. However, when a photographing time interval between two images is relatively long (for example, within five minutes), a probability that the two images are similar images is relatively low, and therefore the hamming distance threshold may be appropriately set to be smaller.

Therefore, for a plurality of identified similar images, the terminal may randomly select one image from the plurality of similar images, or may select an image with optimal image quality or an optimal user expression from the plurality of similar images through smile recognition, definition recognition, or the like; and remove a remaining similar image from the initial story album as an invalid image.

Figure 11:
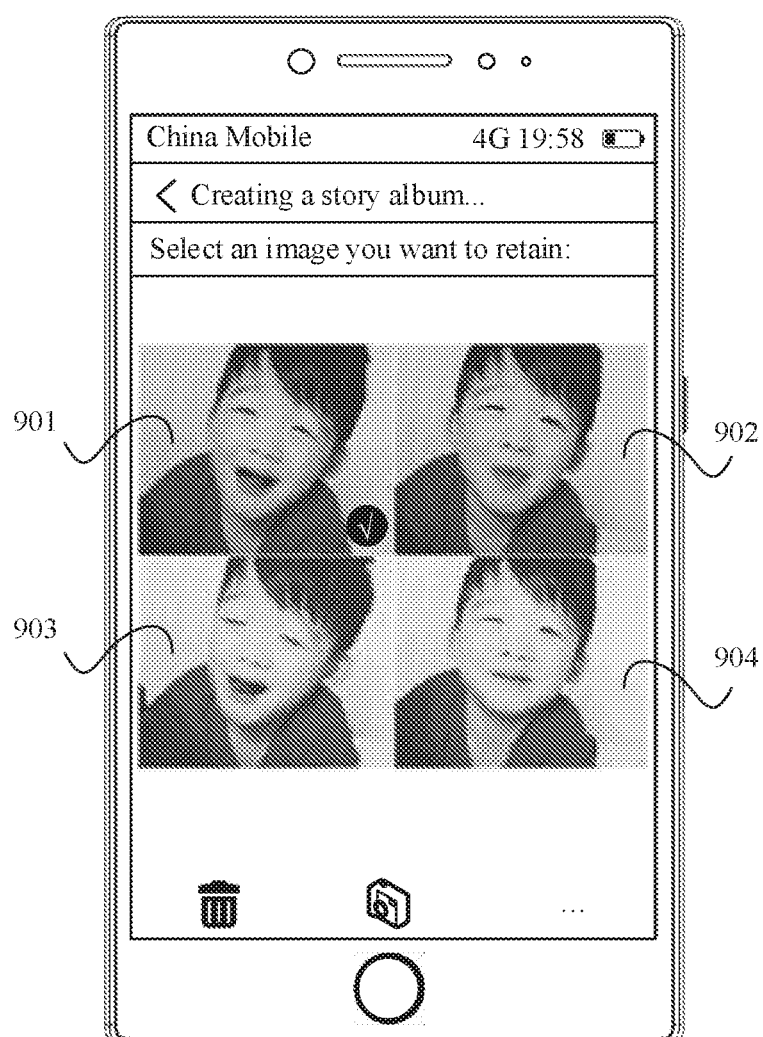
FIG. 11 is a schematic diagram 6 of a scenario of creating a story album according to an embodiment of this application.

Alternatively, as shown in FIG. 11, in a process of creating a story album, the terminal may display a plurality of identified similar images (for example, an image 901 to an image 904 in FIG. 11) to the user. The user manually selects a favorite image (for example, the image 901 in FIG. 11), retains the favorite image in the target story album, and removes remaining similar images (for example, the image 902 to the image 904 in FIG. 11) from the foregoing initial story album as invalid images.

In another possible design method, when storing each image, the terminal may add a label such as "flower", "sun", "house", "dog", "badminton", or "screenshot" to the image based on an image feature of the image. Therefore, in step S503, the terminal may alternatively remove, as the invalid image based on the label of each image in the initial story album, an outlier image whose label is greatly different from a label of an image in the initial story album.

For example, because a story album is usually used to record user's daily life, some uncommon or unnecessary labels such as "scissors", "keyboard", and "screenshot" in daily life may be preset in the terminal as an invalid label list. Therefore, the terminal may determine whether the label of each image in the initial story album is in the invalid label list. If a label of a specific image is in the invalid label list, it indicates that the image is probably an uncommon or unnecessary image in daily life, and therefore the terminal may remove the image with an invalid label from the initial story album as an invalid image.

Figure 12:
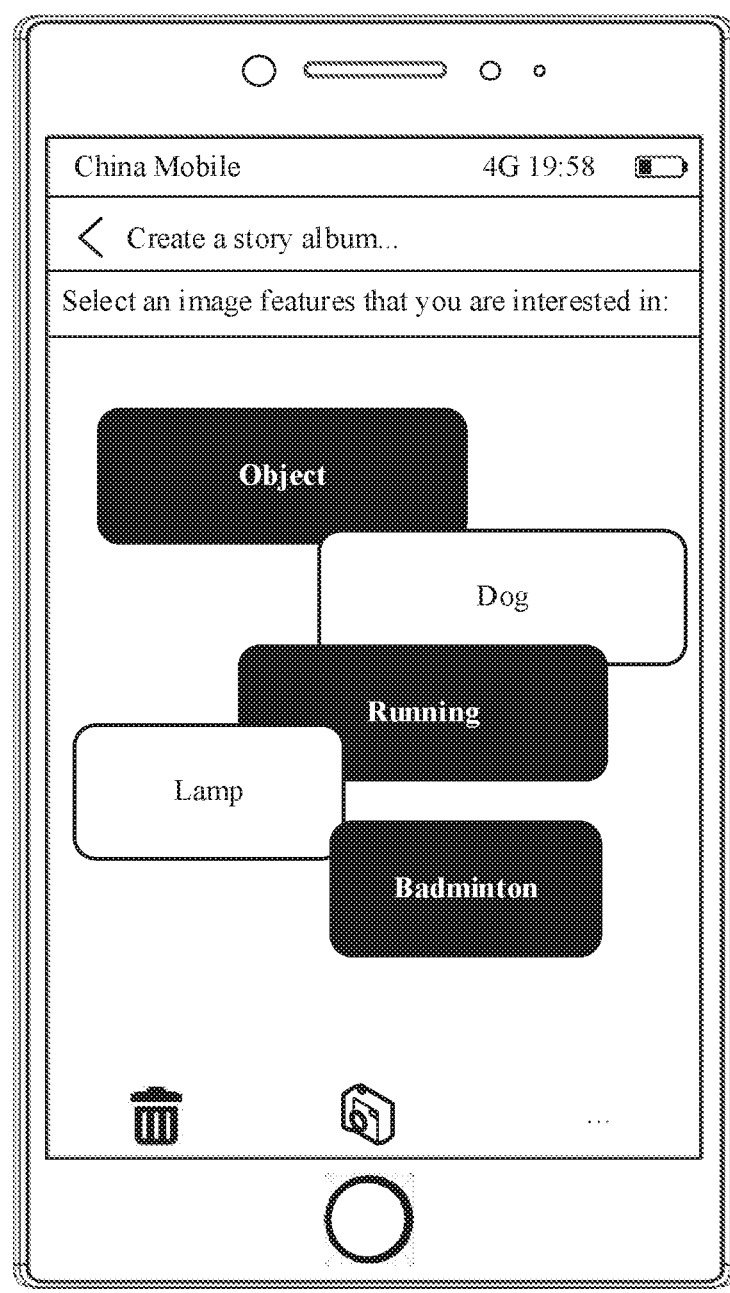
FIG. 12 is a schematic diagram 7 of a scenario of creating a story album according to an embodiment of this application.

Alternatively, in a process of creating a story album, the terminal may display a label of each image in the initial story album to the user. As shown in FIG. 12, relatively frequent labels in the initial story album include "people", "badminton", "light", "running", and "dog". Therefore, the user may manually select a label that interests the user (for example, three labels: "people", "badminton", and "running" in FIG. 12), retain an image with each of the three labels in the target story album, use the other labels as invalid labels, and remove an image with either of the invalid labels from the initial story album as the invalid image.

After the user manually selects, from the candidate labels shown in FIG. 12, the labels that need to be retained in the target story album, the terminal may further determine whether the labels selected to be retained by the user conflict with invalid labels in the invalid label list that is preset by the terminal. For example, in FIG. 12, if the user selects to retain an image with the label "badminton" in the target story album, but the invalid label list also includes the label "badminton", it indicates that the invalid label list that is preset by the terminal is inconsistent with a use habit of the user. Therefore, the terminal may delete the label "badminton" from the invalid label list. In other words, the terminal may subsequently retain the image with the label "badminton" in target images as a valid image. In this way, the terminal may continuously modify the preset invalid label list based on the use habit of the user, so that an invalid label in the invalid label list matches the use habit of the user. This implements customized experience when a story album is created.

Alternatively, when the user uses the terminal for the first time or uses a story album function on the terminal for the first time, the terminal may display the preset invalid label list to the user. In this way, the user may manually modify each invalid label in the invalid label list. For example, the user may delete a label that interests the user from the invalid label list, or the user may add a label that does not interest the user to the invalid label list. Therefore, an invalid label in the invalid label list matches the use habit of the user. This implements customized experience when a story album is created.

Alternatively, the terminal may collect data of user behavior performed by the user on the terminal, for example, a type of a web page browsed by the user or a type of a video watched by the user. Further, the terminal may identify, based on the user behavior data, a label that interests or does not interest the user. In this way, the terminal may modify the preset invalid label list based on the identified label that interests or does not interest the user. Therefore, an invalid label in the invalid label list matches the use habit of the user. This implements customized experience when a story album is created. Certainly, the terminal may alternatively send the user behavior data to a server. After performing big data statistics collection on the user behavior data, the server determines a label that interests or does not interest the user, and periodically pushes the label that interests or does not interest the user to the terminal, so that the terminal modifies the preset invalid label list.

In addition, when removing an image with an invalid label, the terminal may further determine, based on a quantity of images with the invalid label, whether to delete the invalid label for the initial story album. For example, if the terminal presets "car lamp" as an invalid label, but the foregoing initial story album includes more than five images with the label "car lamp", it indicates that the user pays more attention to the car lamp. Therefore, for the initial story album, the label "car lamp" may be modified from an invalid label to a valid label, and an image with the label "car lamp" is retained in the target story album. Therefore, an image that interests the user is prevented from being mistakenly deleted from the initial story album.

It should be noted that, in the foregoing embodiment, an example in which each image has a label, and the label is a keyword is used to describe the foregoing process of generating a target story album. It can be understood that each image may have a plurality of labels. For example, the image 1 has labels: "people" and "leaves". Alternatively, a label of an image may be one or more content descriptions of the image. For example, a label of the image 1 is "user A is reading a book". This is not limited in this embodiment of this application.

Therefore, when an image has a plurality of labels, the terminal may determine, based on a proportion of invalid labels in the plurality of labels, whether the image is used as an invalid image. For example, if the image 2 has labels: "people", "scissors", "mobile phone", and "door", it may be determined, by comparing the labels with labels in the preset invalid image list, that "scissors", "mobile phone", and "door" all are invalid labels. To be specific, 75% of the labels of the image 2 are invalid labels. However, a proportion threshold that is preset by the terminal is 60%. In other words, an image may be used as an invalid image when more than 60% of a plurality of labels of the image are invalid labels. It can be learned that a proportion of the invalid labels in the image 2 is greater than the proportion threshold 60%. Therefore, the terminal may use the image 2 as an invalid image, and remove the image 2 from the initial story album including the image 2.

S504. The terminal determines an album theme of the target story album based on an image feature of each image in the target story album.

In step S504, after obtaining the M images in the target story album, the terminal may determine the album theme of the entire target story album based on the image feature of each image, for example, a sports theme, a wedding theme, a birthday theme, or a travel theme. Certainly, the terminal may adjust an album theme division granularity. For example, the terminal may further divide the sports theme into a water sports theme and a ball sports theme, and may further divide the travel theme into a local travel theme and a non-local travel theme.

A label of each image may reflect an image feature of the image. Therefore, when a proportion of images with a specific label in the M images is greater than a preset proportion, the terminal may use a theme corresponding to the label as the album theme of the target story album. For example, the target story album includes 20 images in total, and 15 images have a label "sports". To be specific, 75% of the images in the target story album have the label "sports". In this case, the terminal may use "sports" as the album theme of the target story album.

For another example, a label distribution model of different album themes may be preset in the terminal, in other words, a label distribution status of all images in a story album corresponding to a specific album theme. Therefore, the terminal may compare a label distribution status of all the images in the target story album obtained in step S503 with the foregoing label distribution model of the different album themes, and use an album theme with a highest similarity in a comparison result as the album theme of the target story album.

Figure 13:
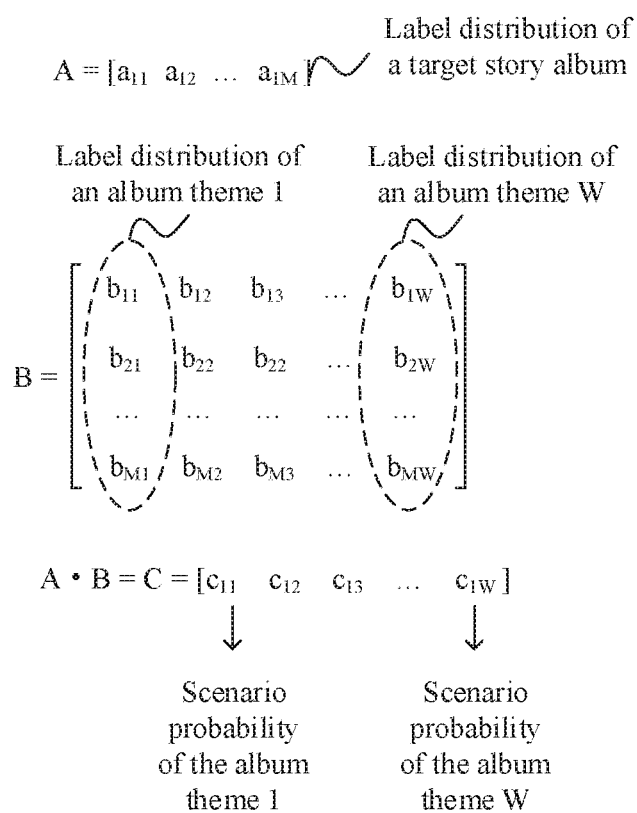
FIG. 13 is a schematic diagram 8 of a scenario of creating a story album according to an embodiment of this application.

For example, the terminal may use a matrix B to represent a label distribution model of different album themes. As shown in FIG. 13, M elements in each column in the matrix B reflect a label distribution status of images in one album theme. In addition, the terminal may represent labels of the M images in the target story album by using a matrix A including one row and M columns. In other words, A=[$a_{11}$ $a_{12}$ ... $a_{1M}$]. Therefore, after the matrix A is multiplied by the matrix B, in other words, $$[a_{11}\ a_{12}\ ...\ a_{1M}] \cdot \begin{bmatrix} b_{11} & \cdots & b_{1W} \\ \vdots & \ddots & \vdots \\ b_{M1} & \cdots & b_{MW} \end{bmatrix},$$

a matrix C, namely, [$c_{11}$ $c_{12}$ ... $c_{1W}$], may be obtained.

Still as shown in FIG. 13, each element in the matrix C is used to indicate a scenario probability of the target story album in a corresponding album theme. Therefore, the terminal may use an album theme corresponding to an element with a highest scenario probability in the matrix C as the album theme of the target story album.

In addition, the terminal may further modify the foregoing label distribution model (namely, the matrix B) by using a classification model such as a naive Bayes classifier, to improve album theme recognition accuracy. Certainly, the terminal may alternatively modify the foregoing label distribution model (namely, the matrix B) by manually modifying the album theme by the user. This is not limited in this embodiment of this application.

Certainly, a specific album theme recognition method is not limited in this embodiment of this application. For example, the terminal may calculate occurrence frequencies of all the image labels in the target story album, and then use an album theme corresponding to a label with a highest occurrence frequency as the album theme of the target story album.

Alternatively, when the labels of the images in the target story album include sentence descriptions of image content, the terminal may identify, through semantic analysis, a frequently used word that appears in the labels. For example, if a word "birthday" appears in labels of eight images in 10 images in the target story album, the terminal may use the frequently used word "birthday" as the album theme of the target story album.

The terminal may further preset an album theme associated with different words that are frequently used. For example, when a frequently used word in labels includes "cake", "candle", or "gift", an album theme associated with the frequently used word is "birthday"; and when a frequently used word in labels includes "ring", "wedding dress", or "bridal bouquet", an album theme associated with the frequently used word is "wedding". Therefore, after identifying the frequently used word in the labels through semantic analysis, the terminal may further determine, based on the foregoing association relationship, an album theme associated with the frequently used word.

Usually, the album theme identified by the terminal may specifically include at least one of "birthday", "party", "wedding", "sports", "graduation", "holiday", "night scene", "local travel", and "non-local travel". This is not limited in this embodiment of this application.

For example, when a photographing location of images in the target story album is a preset location, for example, a resident location of the user, if it is identified that the images include a scene and a human face, the theme of the target story album may be "local travel". Alternatively, when a photographing location of images in the target story album is a non-resident location of the user, if it is identified that the images include a scene, a human face, or a landmark building, the terminal may set the theme of the target story album to "surrounding travel", "short-distance travel", or "long-distance travel" with reference to a distance between the photographing location and a resident location of the user. When it is identified that images in the target story album are a night scene, the terminal may set the theme of the target story album to "night travel". When it is identified that images in the target story album include a cake, the terminal may set the theme of the target story album to "birthday". When it is identified that images in the target story album include food and a human face, the terminal may set the theme of the target story album to "party". When it is identified that images in the target story album include basketball or badminton playing, the terminal may set the theme of the target story album to "sports". When it is identified that images in the target story album include a wedding dress, the terminal may set the theme of the target story album to "wedding".

In other words, on the basis of the initial story album (or the target story album) obtained after the terminal performs processing based on the first dimension of the image attribute information, the terminal may further identify a theme scenario of the initial story album (or the target story album) based on a specific image feature of each image. To be specific, the terminal identifies image content in the initial story album (or the target story album) in an image feature dimension (which is referred to as a second dimension in this embodiment of this application), to determine the theme scenario of the story album, so that the terminal implements multi-dimensional image understanding when creating the story album. In this way, the terminal can identify a distinctly thematic story album generated through theme scenario-centric aggregation. Therefore, this improves efficiency with which the terminal manages an image in the gallery.

S505 (optional). The terminal obtains, from a target application, association information associated with the target story album.

S506 (optional). The terminal modifies the album theme based on the association information.

In step S505, the terminal may further obtain, from the target application such as Reminders, Calendar, Email, Notepad, Phone, Messaging, or Contacts that relates to scheduling of the user, the association information associated with the target story album. For example, if a photographing time of the target story album is November 4, the terminal may read a reminder on November 4, and determine association information indicating that November 4 is mother's birthday.

Therefore, in step S506, the terminal may further process the album theme of the target story album in a dimension of the association information associated with the target application (which is referred to as a third dimension in this embodiment of this application), to modify the album theme determined in step S504.

For example, if the album theme determined in step S504 is "party", and the association information that is associated with the target story album and that may be obtained by the terminal by reading reminder information in Reminders or schedule information in Calendar is "mother's birthday", the terminal may determine that the target story album includes images recording the mother's birthday, and therefore the terminal may modify the theme of the target story album to "mother's birthday party".

For another example, if the album theme determined in step S504 is "food", and the association information that is associated with the target story album and that may be obtained by the terminal by reading SMS message content in Messaging or schedule information in Calendar is "dating with a boyfriend", the terminal may determine that the target story album includes images recording food eaten during dating with the boyfriend, and therefore the terminal may modify the theme of the target story album to "dating and food".

It can be learned that, in this embodiment of this application, the terminal may process an image in the gallery in three dimensions: attribute information of the image, an image feature of the image, and association information that is recorded in the target application and that is associated with the image, to identify a theme scenario of the image in the gallery, so that the terminal aggregates distinctly thematic images to create a thematic story album that strongly interests the user or that is highly valuable to the user.

Certainly, alternatively, the terminal may directly determine, based on schedule information that is entered by the user into the target application, one or more images associated with the schedule information, and then aggregate the one or more images into a target story album. For example, a schedule that is entered by the user into Calendar on September 12 is "taking a cake". In this case, after reading the schedule information, the terminal may aggregate photos photographed on September 12 into a target story album.

Therefore, when displaying the target story album, the terminal may set a title of the target story album to a title associated with the schedule information "taking a cake", for example, "birthday" or "happy birthday", to create a thematic story album that strongly interests the user or that is highly valuable to the user.

S507. The terminal displays, on an album cover of the target story album through overlaying, a title used to reflect the album theme of the target story album.

In other words, the title of the target story album displayed on the album cover through overlaying is associated with the album theme identified in the foregoing embodiment. For example, if the album theme identified by the terminal is "birthday", "birthday" may be displayed on the album cover as the title of the target story album. In other words, the title of the target story album is the same as the identified album theme. Certainly, the title of the target story album may alternatively be another description similar to or related to the meaning of "birthday". This is not limited in this embodiment of this application.

For example, the terminal may preset some corresponding candidate titles for different themes. For example, four candidate titles "sweet birthday", "birthday party", "happy birthday", and "one year older" may be preset for a birthday theme, and then the terminal may select one of the candidate titles to generate the title of the target story album. For example, when the album theme of the target story album is "mother's birthday", the terminal may select the candidate title "birthday party", and generate "mother's birthday party" serving as the title of the target story album.

Figure 14:
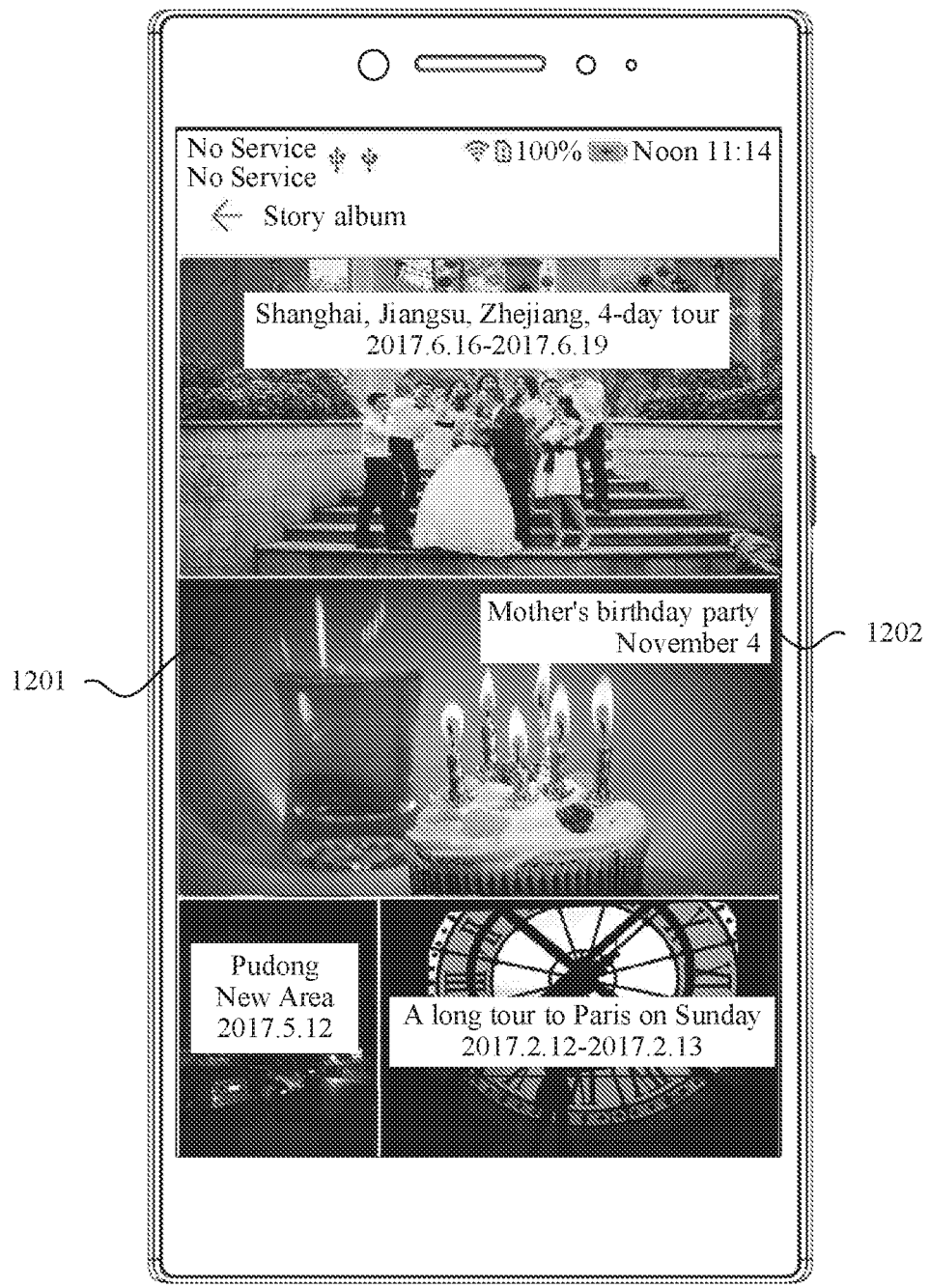
FIG. 14 is a schematic diagram 9 of a scenario of creating a story album according to an embodiment of this application.

In this case, as shown in FIG. 14, the terminal may select one or more images from the created target story album as an album cover 1201 of the target story album, and display a title 1202 "mother's birthday party" on the album cover 1201 through overlaying. When displaying the title of the story album, the terminal may randomly select a font and a font size for displaying, to increase an interest of the story album.

Figure 15:
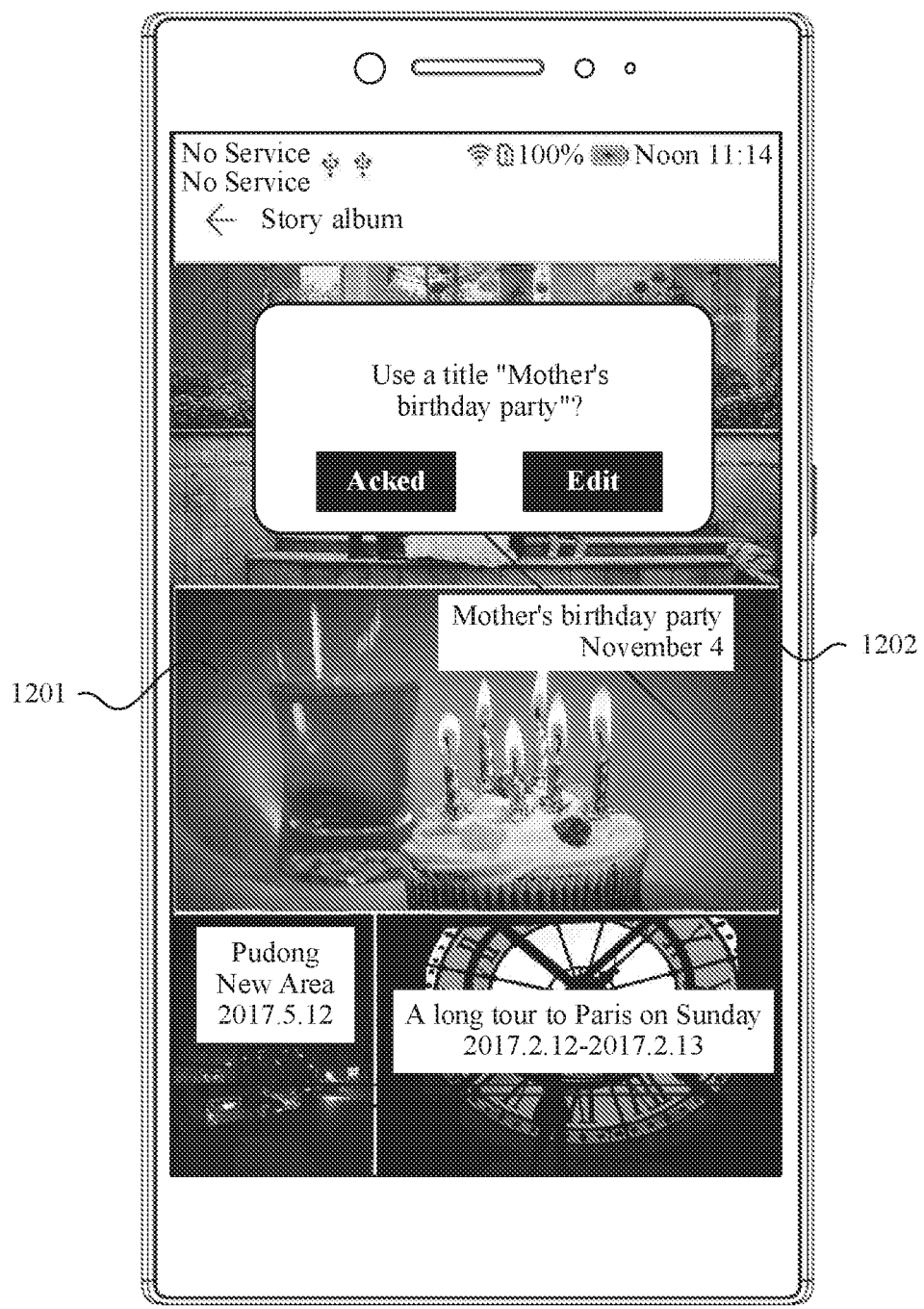
FIG. 15 is a schematic diagram 10 of a scenario of creating a story album according to an embodiment of this application.

In addition, as shown in FIG. 15, after the terminal generates the target story album and determines the title of the target story album by using steps S501 to S507, the terminal may further determine, for the user, whether to use the title. In this case, if the user modifies the title, the terminal displays, on the album cover through overlaying, a title obtained after modification performed by the user. For example, if the user modifies the title "mother's birthday party" determined by the terminal to "birthday party", the title 1202 finally displayed by the terminal on the album cover 1201 through overlaying is "birthday party".

In addition, the terminal may store, as a candidate title of an album theme "birthday", the title "birthday party" that is entered by the user. Subsequently, when the terminal identifies again that the album theme of the created story album is "birthday", the terminal may preferably select, as the title of the story album, the candidate title "birthday party" that is previously set by the user.

Certainly, still as shown in FIG. 14, the terminal may further add related information about a photographing time and/or a photographing location to the title 1202 of the target story album, so that the user can quickly determine, based on at least one of the album theme, the photographing time, or the photographing location, a story album that interests the user.

In the foregoing embodiment, only the birthday theme is used as an example to describe the story album display method provided in this embodiment of this application. It can be understood that, when the terminal generates a story album with another theme by performing multi-dimensional image understanding, a title corresponding to the album theme may be displayed on the album cover of the story album through overlaying according to the foregoing method.

For example, as shown in FIG. 14, when the terminal identifies that a theme of an album A is a wedding theme, the terminal may add a title "happy moment" corresponding to the wedding theme to an album cover of the album A. When the terminal identifies that a theme of an album B is a sports theme, the terminal may add a title "loving sports" corresponding to the sports theme to an album cover of the album B. When the terminal identifies that a theme of an album D is a graduation theme, the terminal may add a title "graduation season" corresponding to the graduation theme to an album cover of the album D. When the terminal identifies that a photographing time of an album E is May Day, the terminal may add a corresponding title "May Day in Lhasa" to an album cover of the album E with reference to a photographing location Lhasa.

Figure 16:
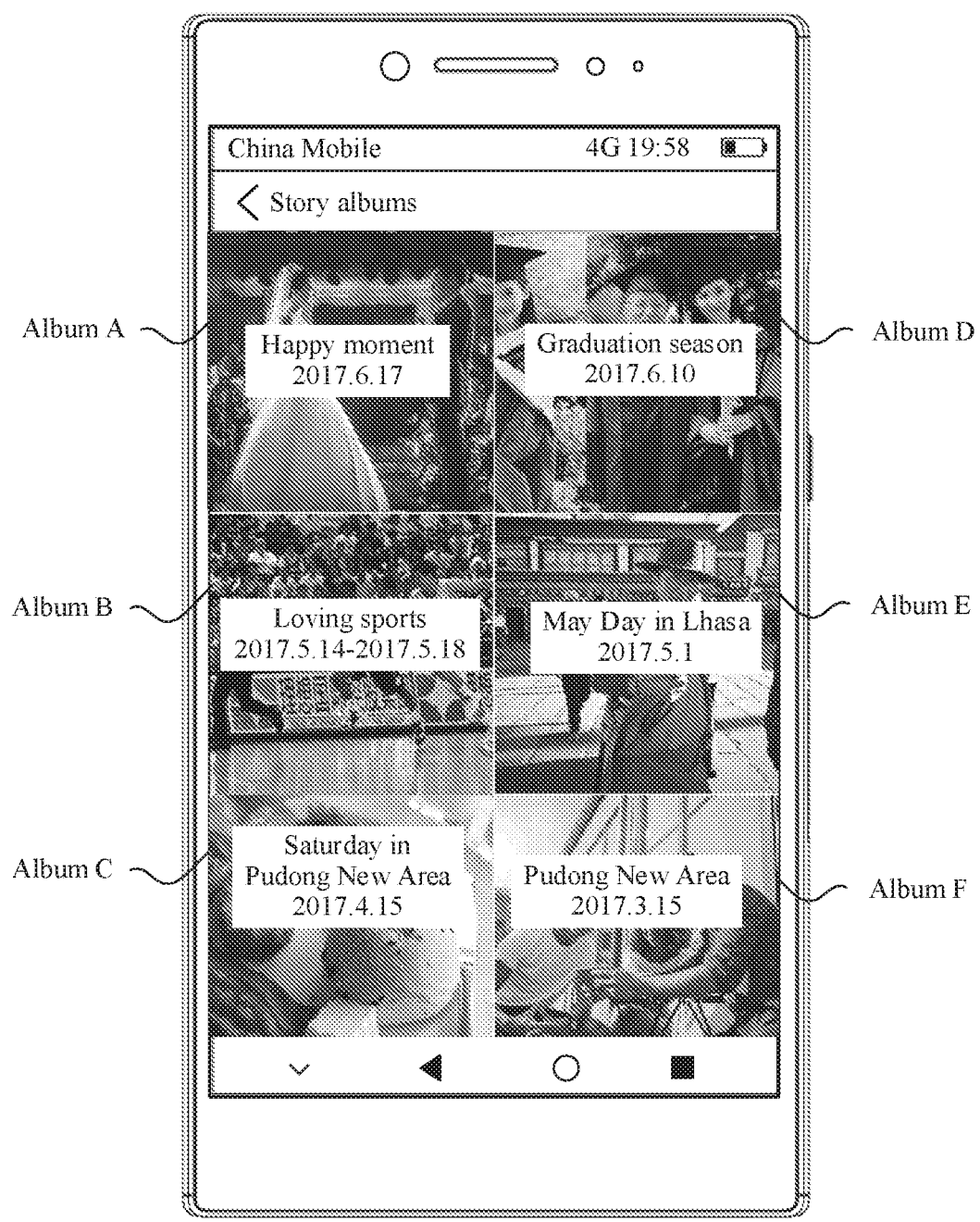
FIG. 16 is a schematic diagram 11 of a scenario of creating a story album according to an embodiment of this application.

Correspondingly, if the terminal does not identify an album theme of a story album, as shown in an album C and an album F in FIG. 16, the terminal may add a read photographing time and/or a read photographing location of the album to an album cover of the story album as a title. This is not limited in this embodiment of this application.

S508 (optional). The terminal plays the target story album.

For example, when the terminal enters a preview interface of a story album function shown in FIG. 14 or FIG. 16, the terminal may be triggered to automatically start to play each story album on the preview interface. As shown in FIG. 16, the terminal may successively play the album A to the album F; or may automatically play, based on a sliding operation performed by the user when the user browses the preview interface, an album displayed at a specific location (for example, an upper left corner) on the display interface.

Alternatively, the user may tap, based on a title of each story album, a story album that interests the user. In this case, if the terminal detects an input operation performed by the user for the target story album, the terminal may jump to a play interface to play an image in the target story album to the user in a form of a short video.

Figure 17A:
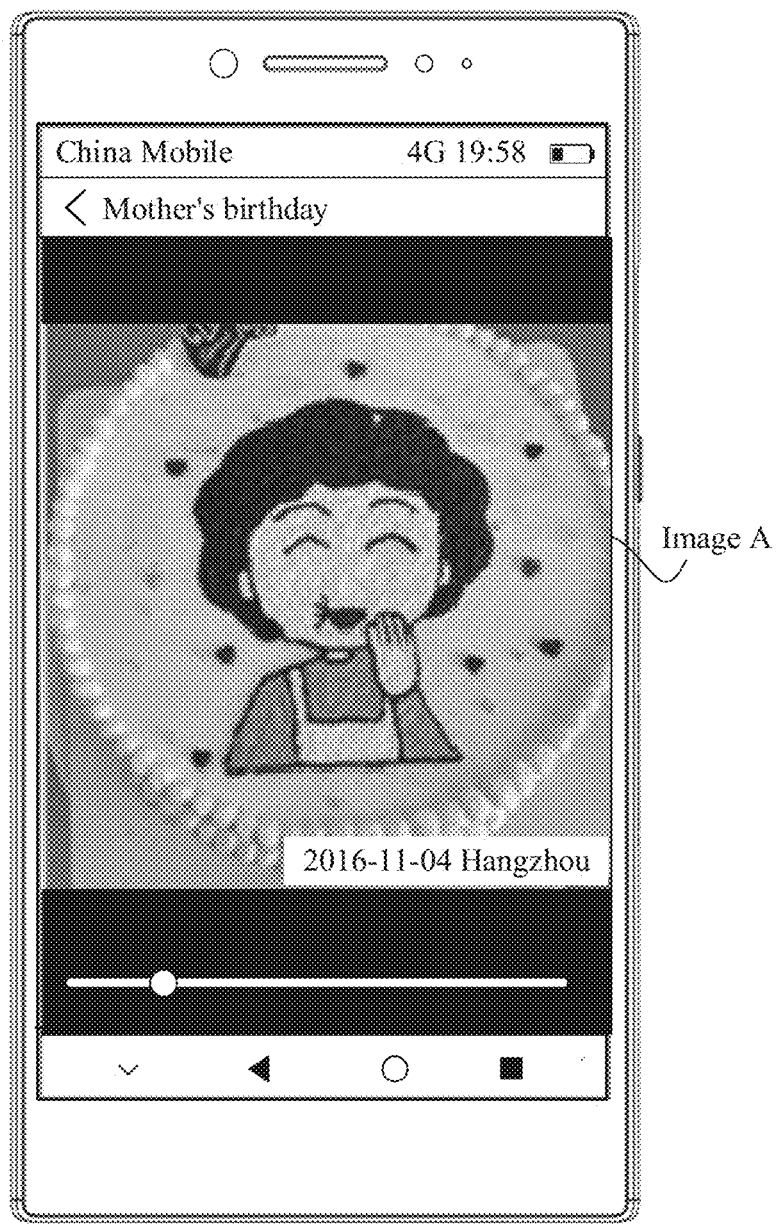
FIG. 17A is a schematic diagram 12 of a scenario of creating a story album according to an embodiment of this application.
Figure 17B:
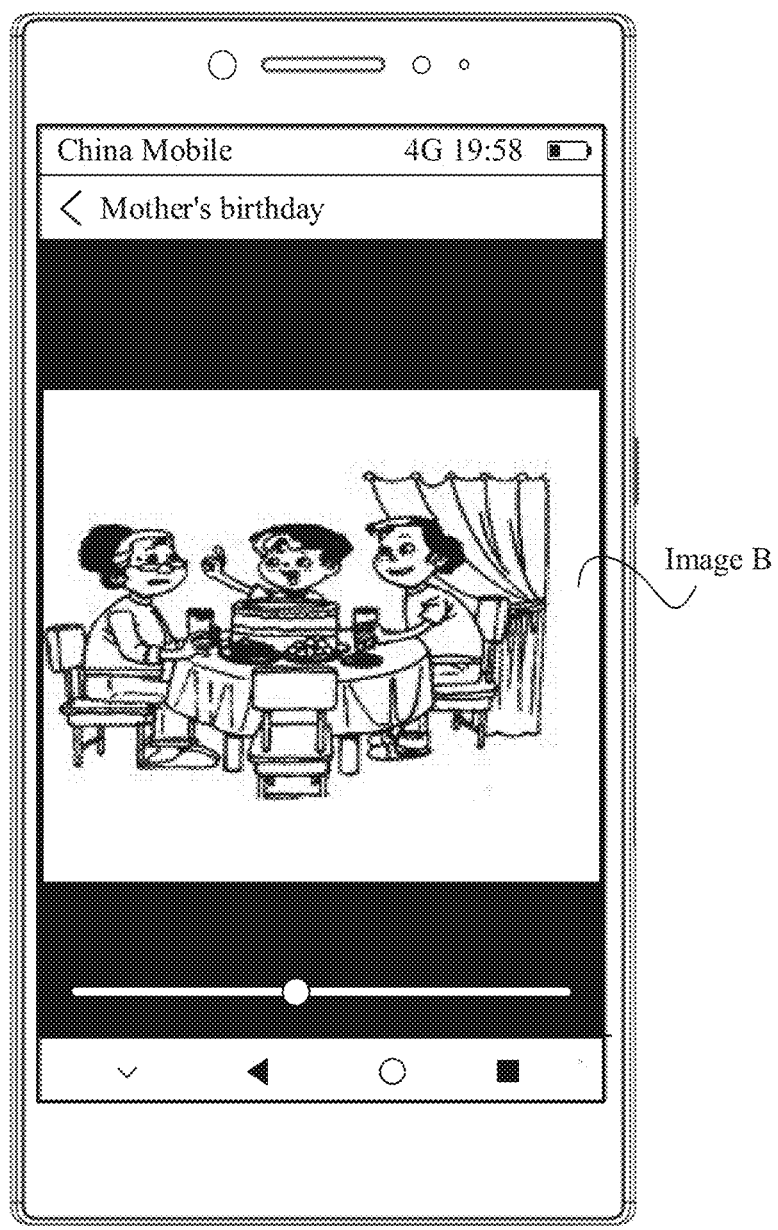
FIG. 17B is another schematic diagram 12 of a scenario of creating a story album according to an embodiment of this application.

In this embodiment of this application, when playing each image in the target story album, the terminal may further display information about the image such as a photographing time, a photographing location, or an image theme on one or more images. As shown in FIG. 17A, when playing an image A in a story album with a title "mother's birthday", the terminal may display a photographing time and a photographing location "2016-11-4, Hangzhou" of the image A on the image A through overlaying. As shown in FIG. 17B, when the terminal plays an image B in the story album, the terminal may display a photographing time and a photographing location "2017-11-4, Beijing" of the image B on the image B through overlaying. Therefore, in a process of playing a story album, this helps the user quickly recall information related to a currently played image, so that user experience of using the story album by the user is improved.

Certainly, a play effect (for example, a music background, a special image effect, a filter, or an editing sequence) for playing the foregoing target story album by the terminal may also be associated with the identified album theme. For example, when it is identified that the album theme of the target story album is "birthday", a birthday song may be used as a music background when the target story album is played. When it is identified that the album theme of the target story album is "old days", an old filter may be added to images in the target story album through overlaying when the target story album is played. In addition, the play effect may alternatively be determined by the user.

When the terminal displays the photographing time and the photographing location on the image A (or the image B) through overlaying, a salient visual region (for example, a region including a human face, a relatively strong contrast, or a relatively large quantity of contour lines) in the image A (or the image B) may be avoided, and a display element (including the photographing time and the photographing location) to be displayed through overlaying are arranged in a non-salient visual region. This avoids a visual conflict between the display element and the image A (or the image B).

Certainly, when a title 1102 is displayed on an album cover 1101 through overlaying, the terminal may alternatively arrange the title 1102 in a non-salient visual region of the album cover 1101. This is not limited in this embodiment of this application.

Figure 18:
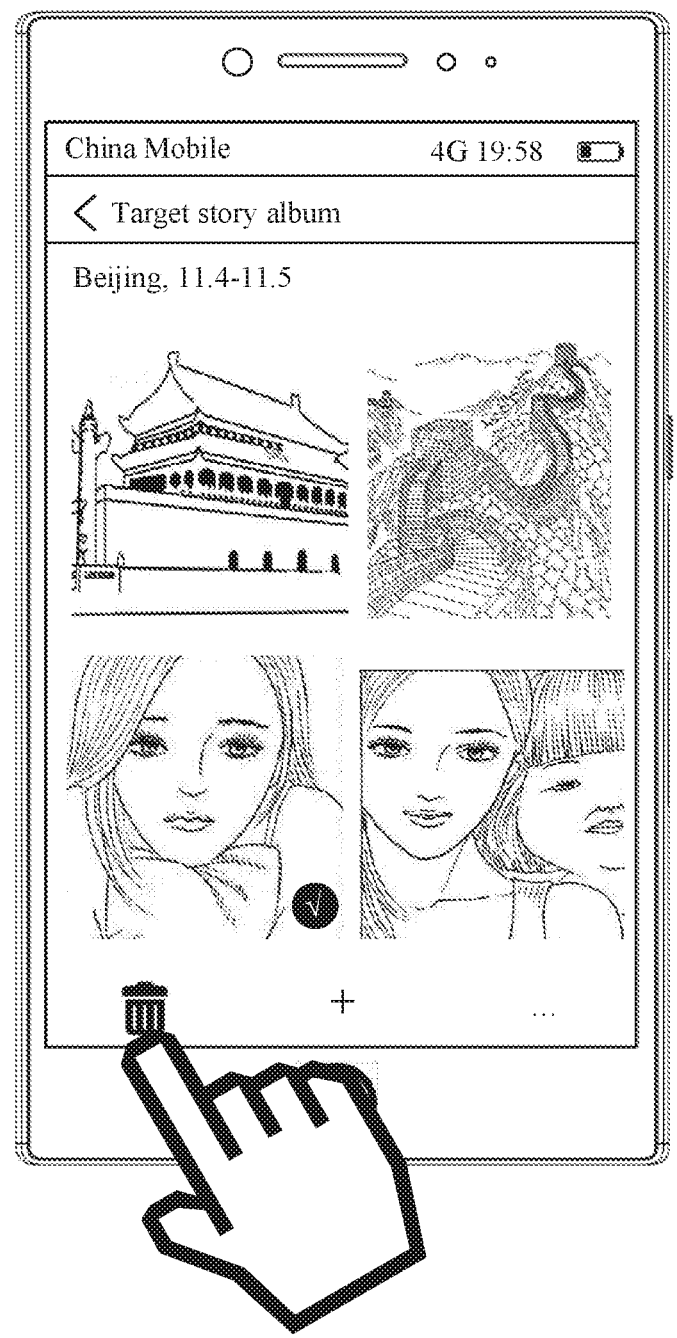
FIG. 18 is a schematic diagram 13 of a scenario of creating a story album according to an embodiment of this application.

In addition, after the target story album is created, the user may further adjust an image in the target story album, for example, add a new image to the target story album, delete an existing image from the target story album, or modify a label of a specific image in the target story album. As shown in FIG. 18, when the user manually adjusts an image in the target story album, the terminal may modify the label distribution model (namely, the matrix B) shown in FIG. 13 based on an adjusted target story album. For example, if the target story album has a wedding theme, when the user adds a new image to the target story album, the terminal may modify, based on the added image, a column vector that is in the matrix B and that is used to indicate the wedding theme. Therefore, this improves accuracy with which the terminal subsequently identifies the wedding theme.

In some other embodiments of this application, the terminal may further provide a function of manually creating a story album by the user. Specifically, the terminal may aggregate, based on conditions that are manually selected by the user such as a photographing time, a photographing location, image content, and an album theme (for example, "birthday", "party", "wedding", "sports", "graduation", "holiday", "night scene", "local travel", and "non-local travel"), images in the gallery that each meet the foregoing conditions into a story album, to customize the expected story album for the user.

Figure 19A:
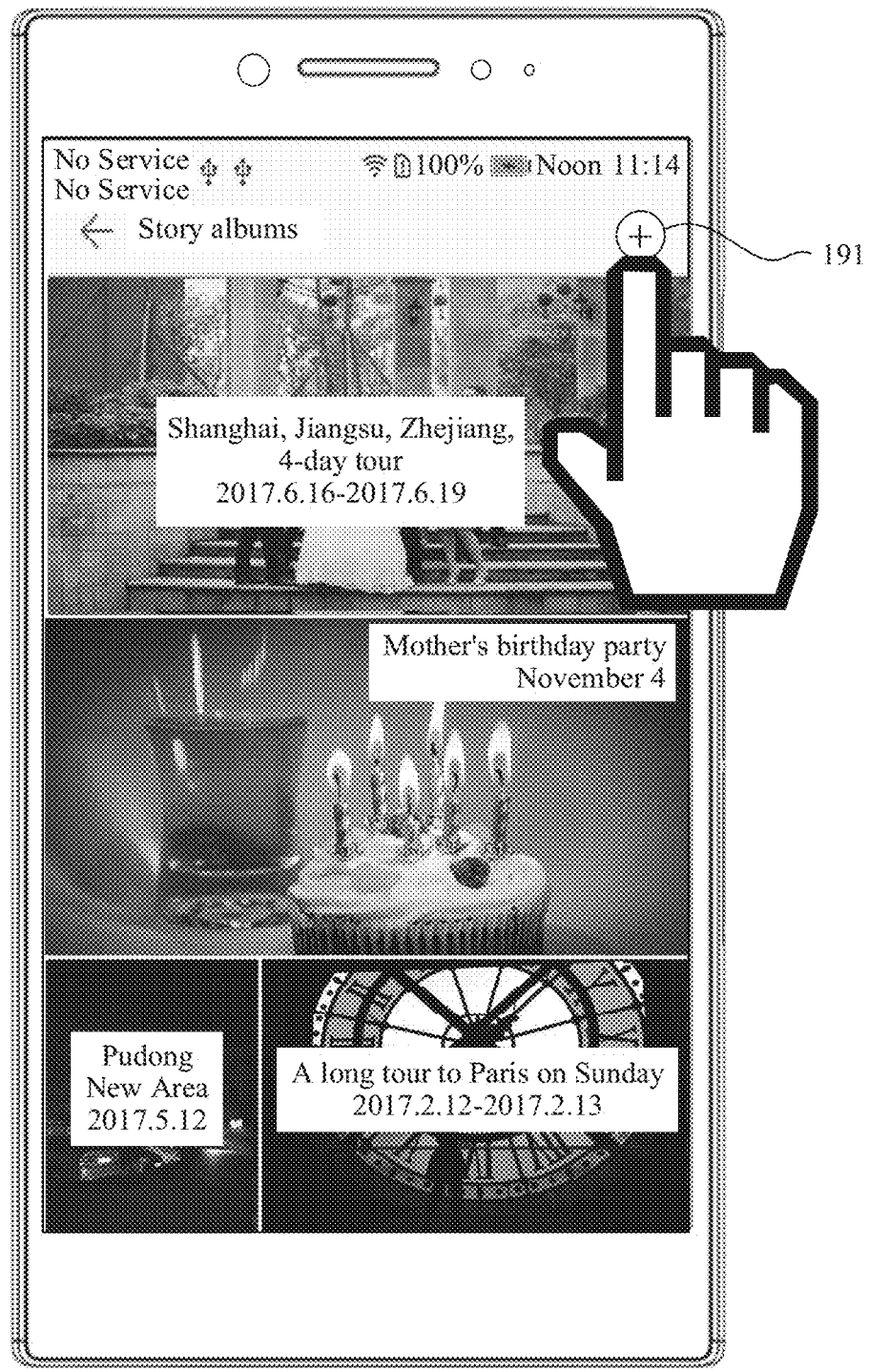
FIG. 19A is a schematic diagram 14 of a scenario of creating a story album according to an embodiment of this application.
Figure 19B:
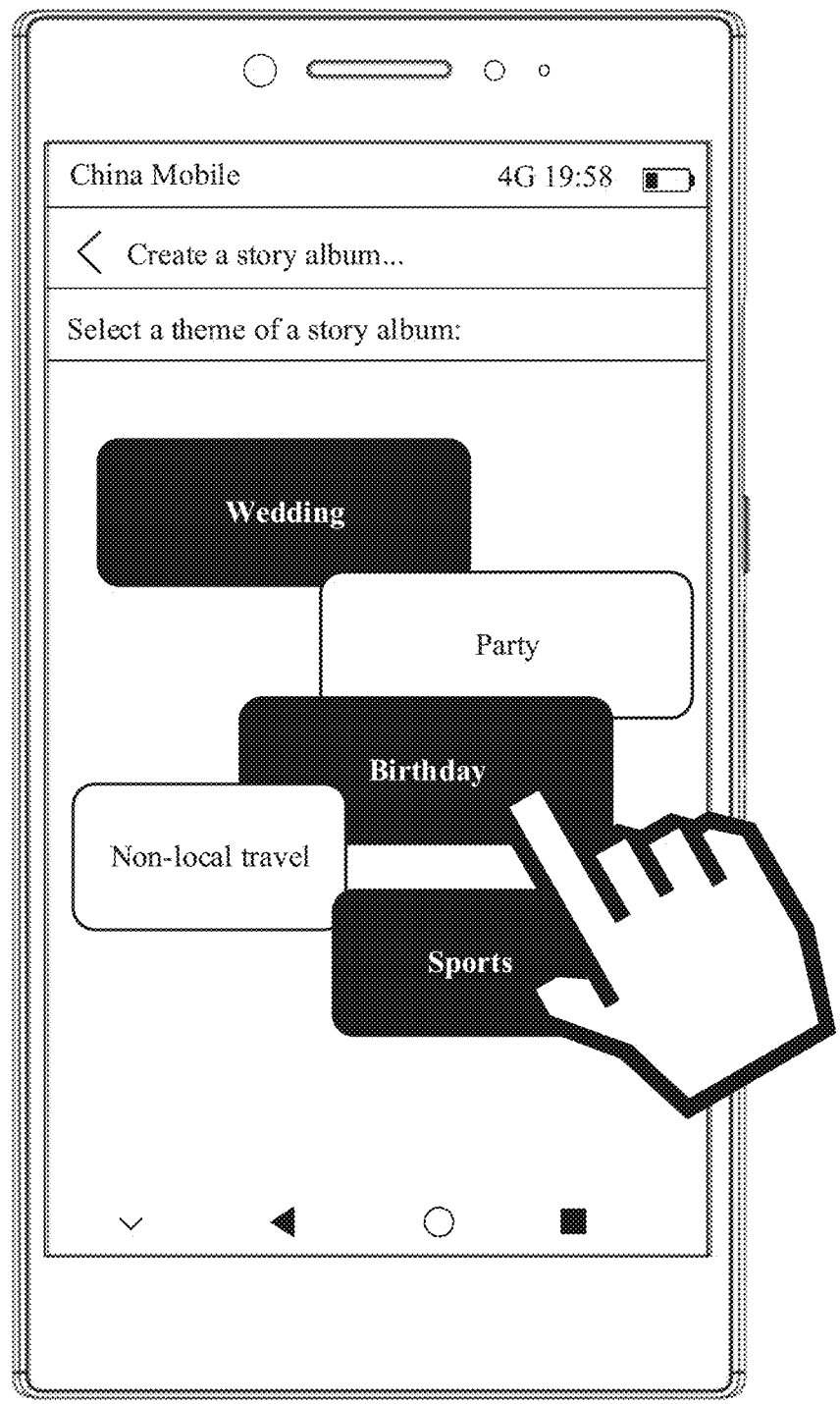
FIG. 19B is another schematic diagram 14 of a scenario of creating a story album according to an embodiment of this application.

For example, as shown in FIG. 19A, the terminal may set, on a display interface of a story album, a shortcut key 191 used to create a new story album. As shown in FIG. 19B, when the terminal detects that the user triggers the shortcut key 191, the terminal may provide the user with one or more album themes for selection, for example, "birthday", "party", "wedding", "sports", "graduation", "holiday", "night scene", "local travel", and "non-local travel".

For example, the user selects "birthday" as an album theme. When detecting that an album theme entered by the user is "wedding", the terminal may aggregate N images that are in the gallery and that are related to "birthday" into an initial story album. For example, the terminal may aggregate images with a label "birthday" or "cake" into an initial story album. For another example, corresponding to label distribution of each preset theme in the matrix B, the terminal may aggregate a group of images that are the same as or similar to label distribution of the preset theme "birthday" into an initial story album.

Figure 20A:
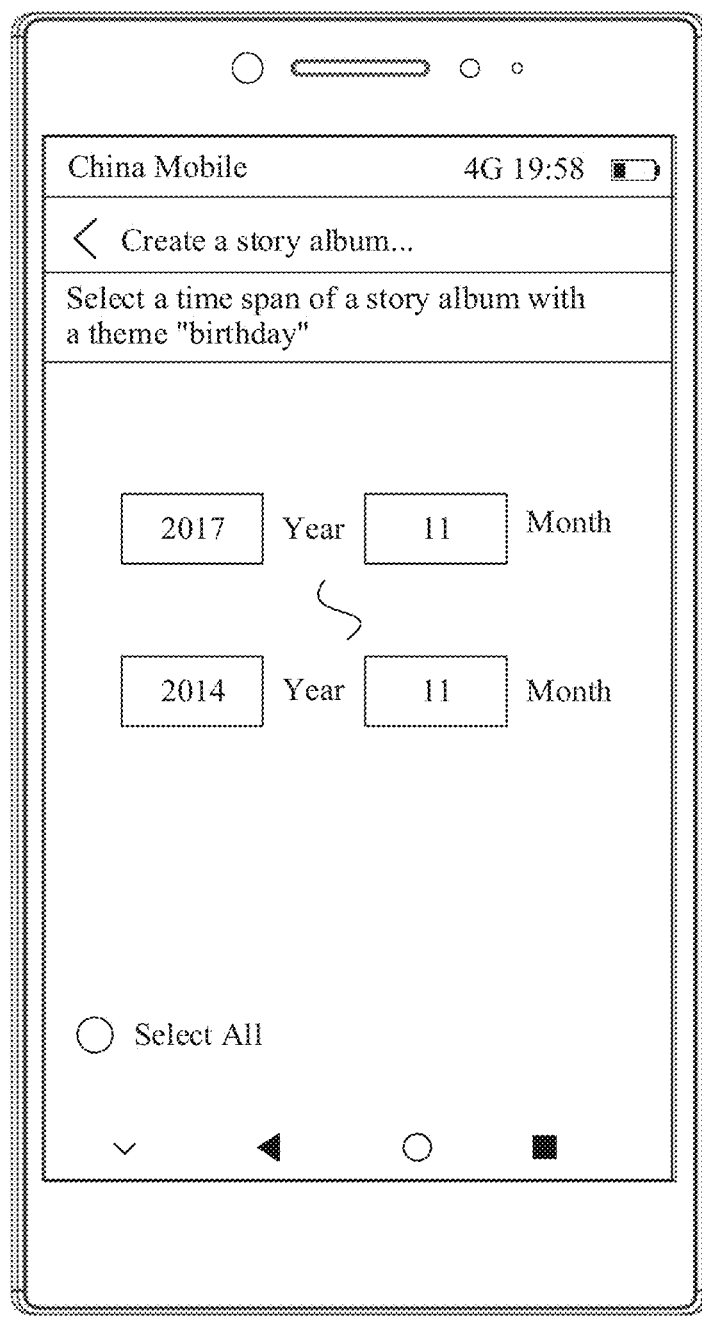
FIG. 20A is a schematic diagram 15 of a scenario of creating a story album according to an embodiment of this application.
Figure 20B:
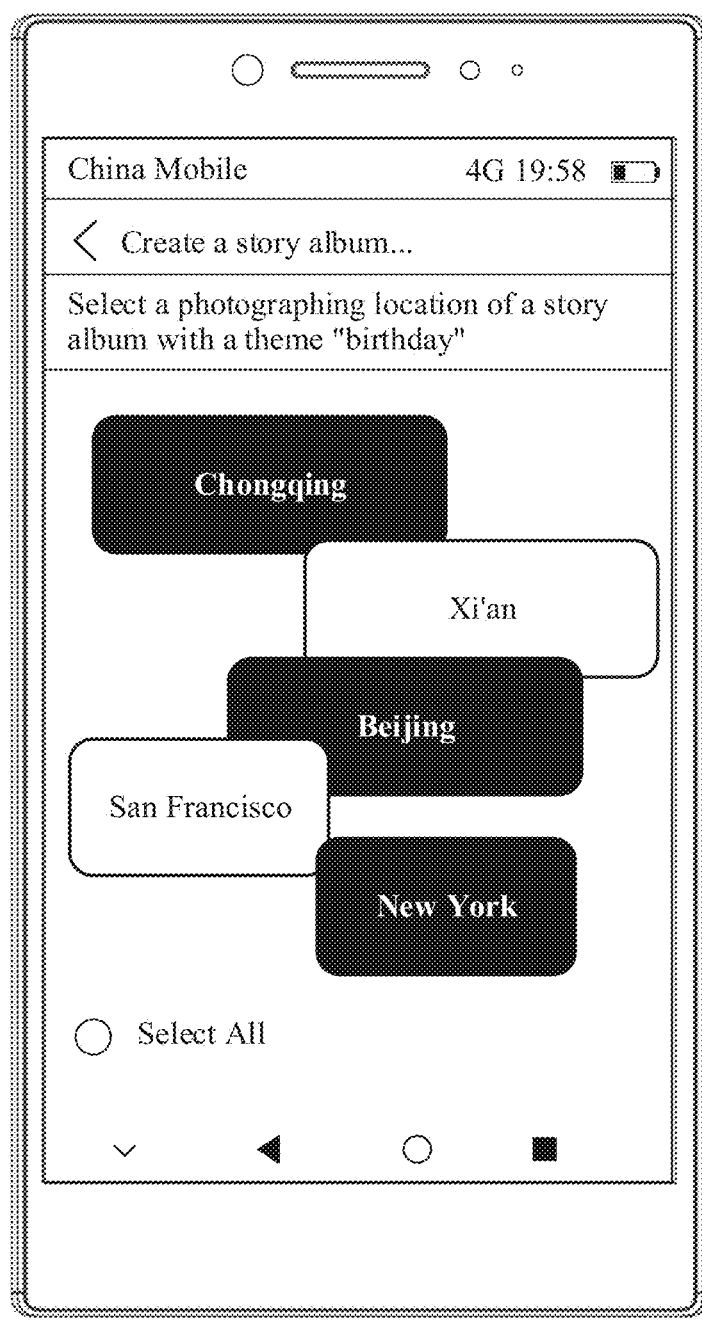
FIG. 20B is another schematic diagram 15 of a scenario of creating a story album according to an embodiment of this application.

Further, as shown in FIG. 20A, the terminal may prompt the user to select images within a specific time span, to make a story album with the theme "birthday". For another example, as shown in FIG. 20B, the terminal may prompt the user to select images photographed at one or more photographing locations, to make a story album with the theme "birthday".

Therefore, the terminal may perform screening on the N images in the initial story album based on a time span and/or a photographing location selected by the user. For example, if the user selects to use images that are photographed at Beijing and Shanghai on November 2014 to November 2017, to make a story album with the theme "birthday", the terminal may remove, from the initial story album, an image whose photographing time is beyond November 2014 to November 2017 and an image whose photographing location is not Beijing and Shanghai, to obtain the target story album including the M images.

Subsequently, the terminal may still continue to use the foregoing method in steps S507 and S508 to display the title related to the theme "birthday" on the album cover of the target story album, and play the target story album.

Figure 21A:
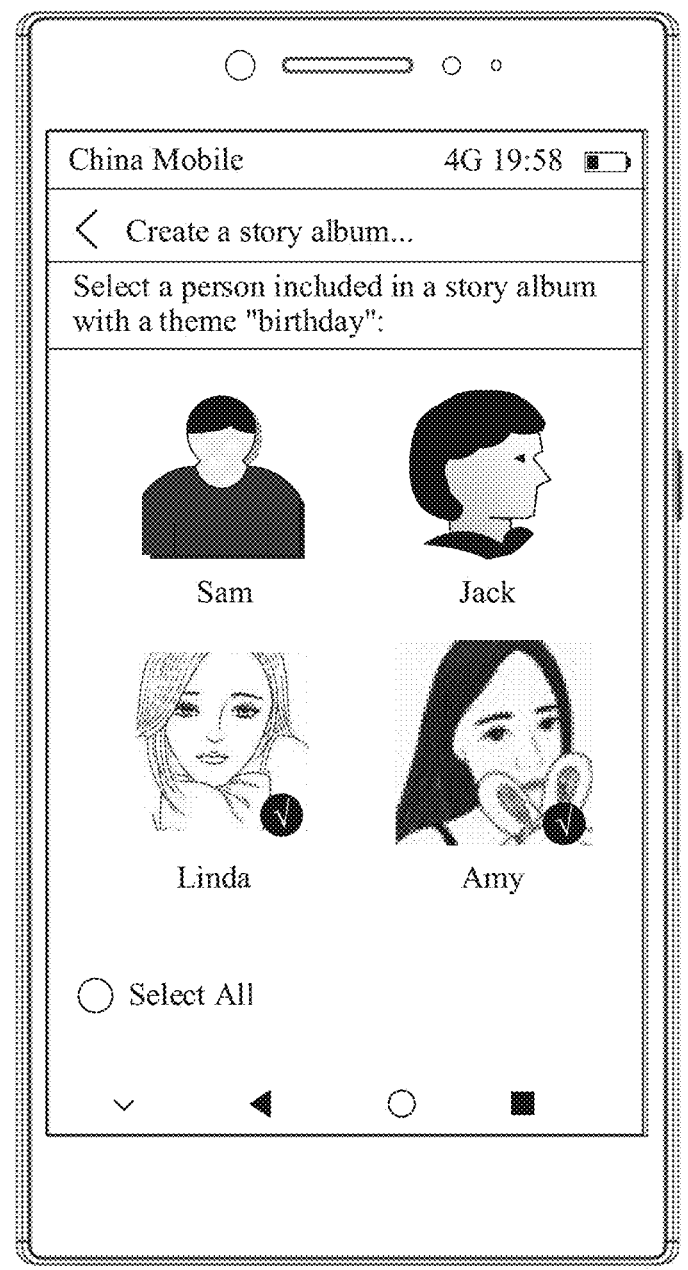
FIG. 21A is a schematic diagram 16 of a scenario of creating a story album according to an embodiment of this application.
Figure 21B:
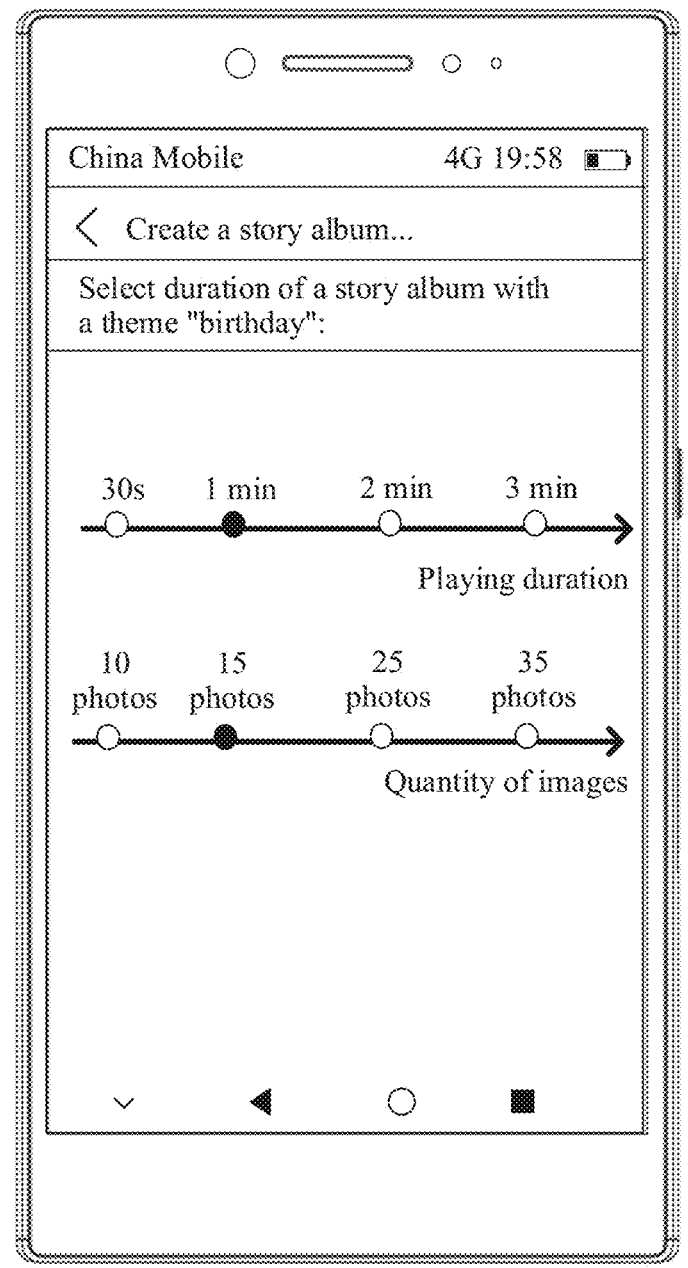
FIG. 21B is another schematic diagram 16 of a scenario of creating a story album according to an embodiment of this application.

Certainly, when generating the M images in the target story album, the terminal may further consider factors such as a person, a quantity of images, and album play duration. For example, as shown in FIG. 21A, the terminal may perform face detection on each image in the initial story album, and prompt the user with one or more detected human faces. Therefore, the terminal can remove, from the initial story album based on a target human face subsequently selected by the user, an image that does not include the target human face, to obtain the target story album. For another example, as shown in FIG. 21B, the terminal may prompt the user to set play duration or a quantity of images of the target story album. Therefore, the terminal may remove a superfluous image from the initial story album based on target play duration or a quantity of target images subsequently set by the user, to obtain the target story album.

In addition, when the terminal detects that the user triggers the shortcut key 191, the terminal may first prompt the user to select a target human face from a plurality of identified human faces, and then aggregate images that are in the gallery and that include the target human face into an initial story album. Subsequently, the terminal may generate a target story album based on one or more factors such as an album theme, a photographing time, and a photographing location that are entered by the user.

In other words, the terminal may prompt the user to select one or more conditions such as an album theme, an included person, a photographing time, a photographing location, and a quantity of images of a story album, and obtain a related image through screening based on the condition selected by the user, to create the story album that is expected by the user.

Figure 22A:
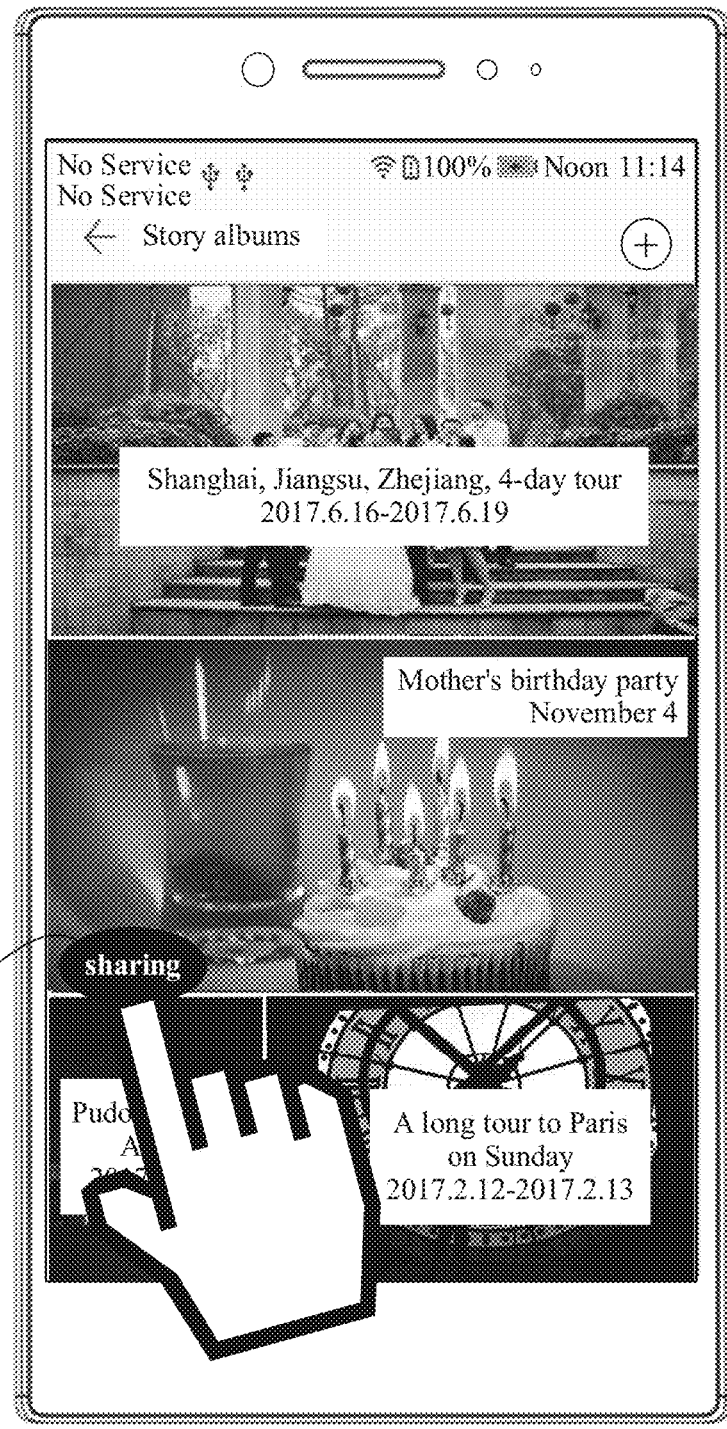
FIG. 22A is a schematic diagram 17 of a scenario of creating a story album according to an embodiment of this application.
Figure 22B:
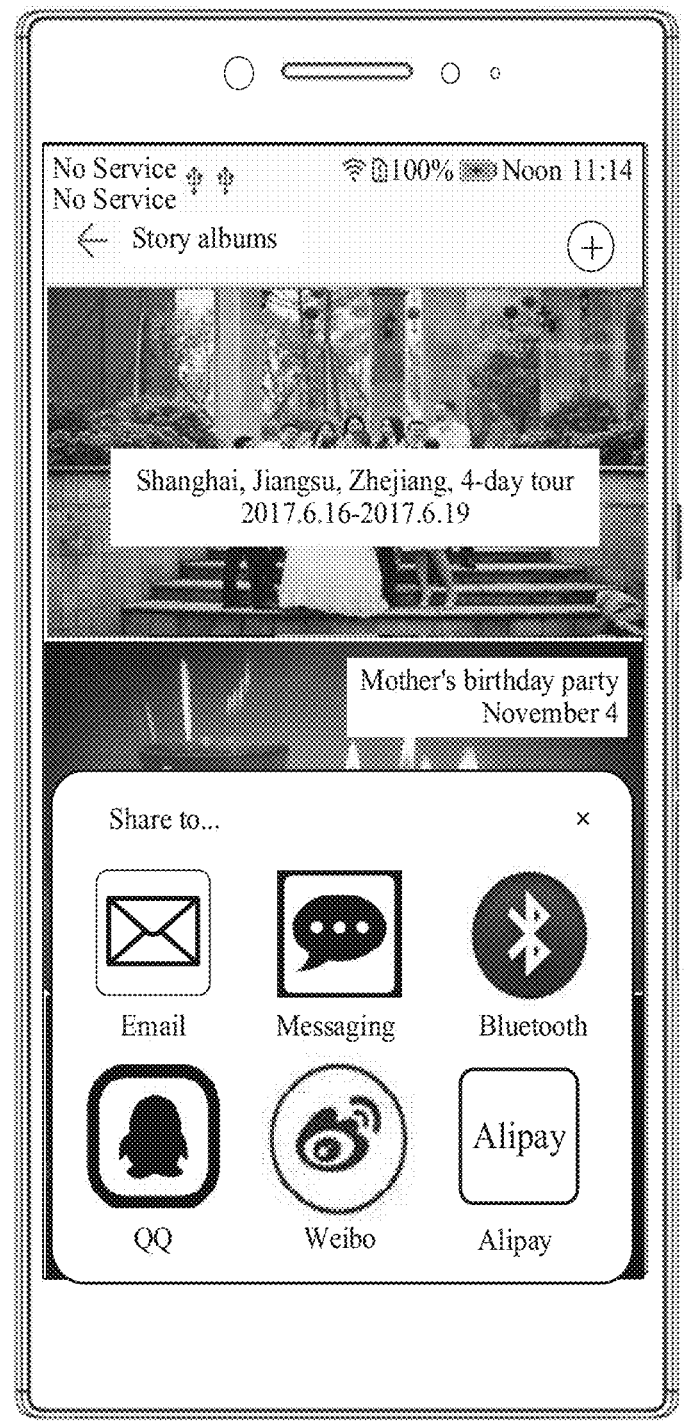
FIG. 22B is another schematic diagram 17 of a scenario of creating a story album according to an embodiment of this application.

In addition, as shown in FIG. 22A, after the terminal creates the foregoing target story album, a sharing shortcut key 221 for sharing the story album may be further provided on the display interface of the story album. As shown in FIG. 22B, after the user triggers the sharing shortcut key 221, the user may further select to share one or more created story albums with another application or another terminal. This is not limited in this embodiment of this application.

It can be understood that, to implement the foregoing functions, the terminal and the like each include corresponding hardware structures and/or software modules for performing the foregoing functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. During actual implementation, another division manner may be used.

Figure 23:
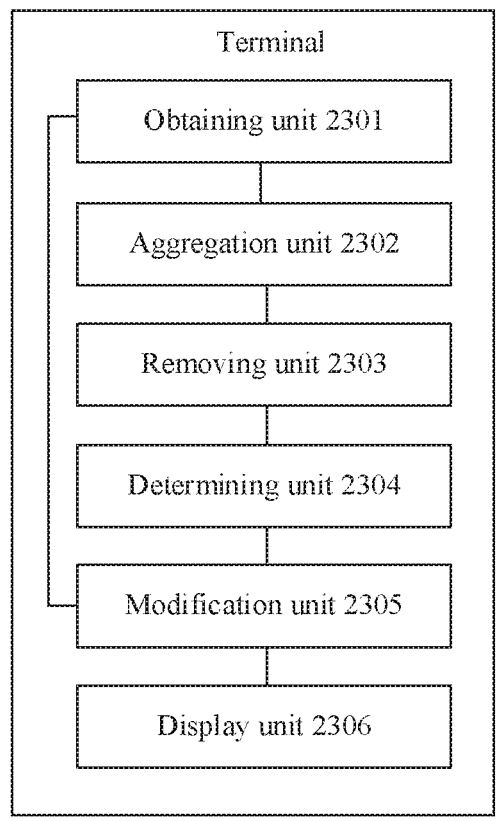
FIG. 23 is a schematic structural diagram 2 of a terminal according to an embodiment of this application.

When function modules are obtained through division based on corresponding functions, FIG. 23 is a possible schematic structural diagram of a terminal in the foregoing embodiments. The terminal includes an obtaining unit 2301, an aggregation unit 2302, a removing unit 2303, a determining unit 2304, a modification unit 2305, and a display unit 2306.

The obtaining unit 2301 is configured to support the terminal in performing processes 501 and 505 in FIG. 5. The aggregation unit 2302 is configured to support the terminal in performing process 502 in FIG. 5. The removing unit 2303 is configured to support the terminal in performing process 503 in FIG. 5. The determining unit 2304 is configured to support the terminal in performing process 504 in FIG. 5. The modification unit 2305 is configured to support the terminal in performing process 506 in FIG. 5. The display unit 2306 is configured to support the terminal in performing processes 507 and 508 in FIG. 5. All related content of the steps in the foregoing method embodiments may be cited in function descriptions of corresponding function modules. Details are not described herein again.

When an integrated unit is used, the aggregation unit 2302, the removing unit 2303, the determining unit 2304, and the modification unit 2305 may be integrated into a processing module, the obtaining unit 2301 is used as an input module, and the display unit 2306 is used as a display module. Certainly, the terminal may further include a storage module.

Figure 24:
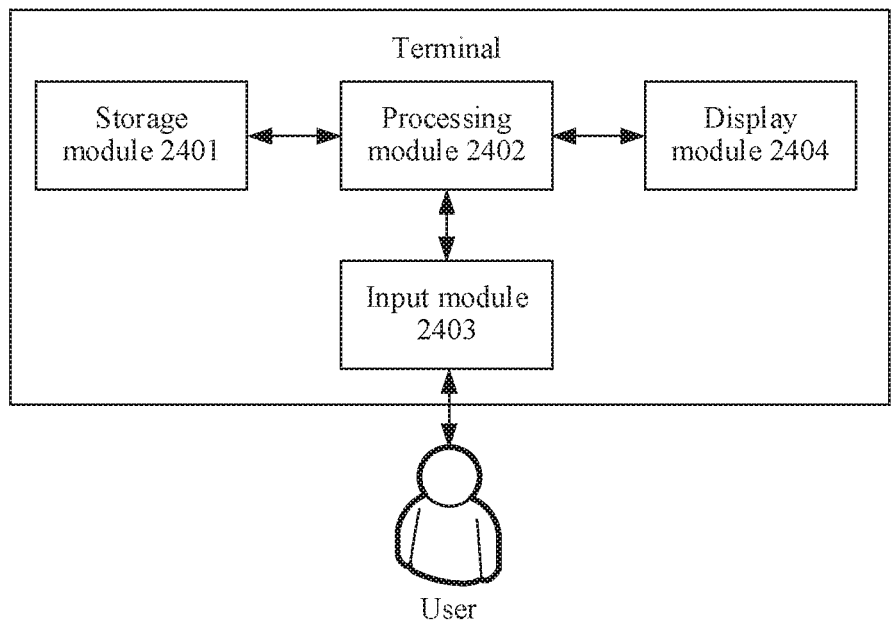
FIG. 24 is a schematic structural diagram 3 of a terminal according to an embodiment of this application.

In this case, FIG. 24 is a possible schematic structural diagram of a terminal in the foregoing embodiments. A processing module 2402 is configured to control and manage an action of the terminal. An input module 2403 is configured to support receiving of information that is entered by a user. A storage module 2401 is configured to store program code and data of the terminal. A display module 2404 is configured to display the information entered by the user or information provided for the user, and various menus of the terminal.

For example, the processing module 2402 may be a processor or a controller, such as a central processing unit (Central Processing Unit, CPU), a GPU, a general-purpose processor, a digital signal processor (Digital Signal Processing, DSP), an application-specific integrated circuit (Application-Specific Integrated Circuit, ASIC), a field programmable gate array (Field Programmable Gate Array, FPGA) or another programmable logic device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The input module 2403 may be a component configured to receive the information that is entered by the user, for example, a touchscreen or a microphone.

The storage module 2401 may be a memory. The memory may include a high-speed random access memory (RAM), or may include a nonvolatile memory, such as a disk storage device, a flash memory device, or another volatile solid-state storage device.

The display module 2404 may be a display, and the display may be specifically configured in a form of a liquid crystal display, an organic light-emitting diode, or the like. In addition, a touchpad may be further integrated into the display, and is configured to: collect a touch event performed on or near the touchpad; and send collected touch information to another component (such as the processor).

Figure 25:
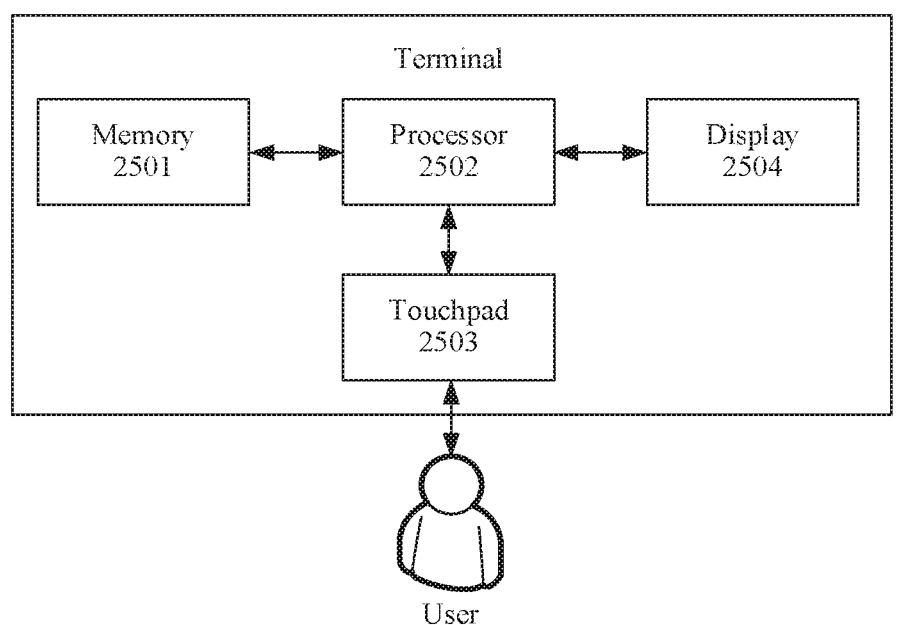
FIG. 25 is a schematic structural diagram 4 of a terminal according to an embodiment of this application.

When the processing module 2402 is a processor, the input module 2403 is a touchpad, the storage module 2401 is a memory, and the display module 2404 is a display, FIG. 25 shows a structure of a terminal provided in an embodiment of this application.

In a possible design method, a memory 2501 stores at least N (N>1) images, and a processor 2502 may aggregate N images in the memory 2501 based on a first dimension. The first dimension includes a photographing time and/or a photographing location. Further, the processor 2502 may instruct a display 2504 to display an album cover of a story album. The story album includes M (M<N) images in the N images, and the M images are associated with a theme of the story album.

After the processor 2502 aggregates the N images in a gallery based on the first dimension, the processor 2502 may further remove an invalid image from the N images, to obtain the story album including the M images. The invalid image includes an image with an invalid label, or one or more images with an image similarity greater than a threshold.

After the processor 2502 removes the invalid images from the N images, to obtain the story album including the M images, the processor 2502 may further determine, based on a second dimension, a theme associated with the M images, to obtain the theme of the story album. The second dimension includes an image feature of at least one of the M images.

After the processor 2502 determines, based on the second dimension, the theme associated with the M images, to obtain the theme of the story album, the processor 2502 may further modify the theme of the story album based on a third dimension. The third dimension includes association information that is in a target application and that is associated with the theme of the story album.

Further, the first dimension includes the photographing time. In this case, that the processor 2502 aggregates the N images in the gallery based on the first dimension specifically includes the following: The processor 2502 aggregates images generated in each of Z (Z≥2) time periods into one image set, to obtain Z image sets, where the Z image sets are in a one-to-one correspondence with the Z time periods; and when a time interval between adjacent image sets is less than an interval threshold, the processor 2502 aggregates the adjacent image sets.

Further, that the processor 2502 determines, based on the second dimension, the theme associated with the M images, to obtain the theme of the story album specifically includes the following: The processor 2502 compares a label distribution status of the M images with a preset label distribution status of each candidate theme; and when the label distribution status of the M images meets a label distribution status of a first candidate theme, the processor 2502 determines the first candidate theme as the theme of the story album.

Further, that the processor 2502 removes the invalid image from the N images specifically includes the following: The display 2504 displays X (X≥2) images with a similarity greater than the threshold that are identified from the N images; and a touchpad 2503 receives a target image selected by a user from the X images. In this case, in response to the target image selected by the user from the X images, the processor 2502 retains the target image in the story album, remove a remaining image from the X images other than the target image.

Further, that the processor 2502 removes the invalid image from the story album specifically includes the following: The display 2504 displays Y (Y≥2) labels identified from the N images, and a label of each image is used to reflect an image feature of the image. The touchpad 2503 receives a target label selected by the user from the Y labels. In response to the target label selected by the user from the Y labels, the processor 2502 retains an image with the target label in the story album, and removes an image without the target label.

After the display 2504 displays the album cover of the story album, the display 2504 may further play the story album. When playing a first image in the story album, the terminal displays a photographing time and/or a photographing location of the first image.

The first dimension may further include at least one of a person that appears in the story album, play duration of the story album, a quantity of images in the story album, and the theme of the story album. In this case, before the processor 2502 aggregates the N images in the gallery based on the first dimension, the touchpad 2503 may further receive at least one of a target time period, a target photographing location, a target person, target play duration, a quantity of target images, and a target theme that are entered by the user for a to-be-created story album.

In another possible design method, the memory 2501 stores at least N (N>1) images, and the touchpad 2503 may receive schedule information that is entered by the user into a target application (for example, Reminders, Calendar, Email, Notepad, Phone, Messaging, and Contacts). Further, the processor 2502 creates a story album by aggregating N images in the memory 2501; and instructs the display 2504 to display an album cover of the story album. The album cover includes a title of the story album, and the title is associated with the schedule information.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedures or functions according to all or some of the embodiments of this application are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A story album display method, implemented by a terminal, comprising:
   aggregating N images in a gallery based on a first dimension, wherein the first dimension comprises a photographing time or a photographing location, and wherein N>1;
   receiving a user selection of a target image for retaining from the N images;
   removing, in response to the user selection, a first image from the N images to obtain a story album comprising M images, wherein the first image conflicts with a characteristic of the target image, and wherein the first image comprises an image with an invalid label or one or more images with an image similarity greater than a threshold;
   after removing the first image from the N images to obtain the story album comprising the M images, determining, based on a second dimension, a theme associated with the M images to obtain the theme of the story album, wherein the second dimension comprises an image feature of at least one of the M images;
   after determining, based on the second dimension, the theme associated with the M images to obtain the theme of the story album, modifying the theme of the story album based on a third dimension, wherein the third dimension comprises association information that is in a target application and that is associated with the theme of the story album; and displaying an album cover of the story album,
wherein the M images are associated with the theme of the story album, and
wherein M<N.

2. The story album display method of claim 1, wherein the theme of the story album comprises at least one of "birthday," "party," "wedding," "sports," "graduation," "holiday," "night scene," "local travel," or "non-local travel".

3. The story album display method of claim 1, wherein the album cover comprises a title of the story album, and wherein the title is associated with at least one of the theme of the story album, a photographing time of the N images, or a photographing location of the N images.

4. The story album display method of claim 1, wherein the first dimension comprises the photographing time, wherein aggregating the N images in the gallery based on the first dimension comprises aggregating images generated within each of Z time periods into one image set to obtain Z image sets, wherein the Z image sets are in a one-to-one correspondence with the Z time periods, wherein Z≥2, and wherein when a time interval between adjacent image sets is less than an interval threshold, the story album display method further comprises aggregating the adjacent image sets.

5. The story album display method of claim 4, wherein the first dimension further comprises the photographing location, wherein when a photographing location of adjacent image sets is not a preset location, the interval threshold is a first preset value, or wherein when the photograph location of the adjacent image sets is the preset location, the interval threshold is a second preset value, and wherein the second preset value is less than the first preset value.

6. The story album display method of claim 1, wherein determining, based on the second dimension, the theme associated with the M images to obtain the theme of the story album comprises:
comparing a label distribution status of the M images with a preset label distribution status of each candidate theme; and
determining a first candidate theme as the theme of the story album when the label distribution status of the M images meets a label distribution status of a first candidate theme.

7. The story album display method of claim 1, wherein the first image conflicts with a photographing time characteristic or a photographing location characteristic of the target image, and wherein removing the first image from the N images comprises:
displaying X images with image similarities greater than the threshold that are identified from the N images, wherein X≥2; and
retaining the target image in the story album and removing a remaining image from the X images other than the target image in response to the target image being selected by a user from the X images.

8. The story album display method of claim 1, wherein removing the first image from the N images comprises:
displaying Y labels identified from the N images, wherein a label of each image reflects an image feature of the image, and wherein Y≥2; and
retaining an image with a target label in the story album and removing an image without the target label in response to the target label being selected by a user from the Y labels.

9. The story album display method of claim 1, wherein after displaying the album cover of the story album, the story album display method further comprises playing the story album, and wherein when playing the first image in the story album, the terminal displays a photographing time or a photographing location of the first image.

10. The story album display method of claim 1, wherein the first dimension further comprises at least one of a person that appears in the story album, a playing duration of the story album, a quantity of images in the story album, or the theme of a story, and wherein before aggregating the N images in the gallery based on the first dimension, the story album display method further comprises receiving at least one of a target time period, a target photographing location, a target person, a target playing duration, a quantity of target images, or a target theme that are entered by a user for a to-be-created story album.

11. The story album display method of claim 1, further comprising:
applying a hashing algorithm to the N images to obtain hamming distances between the N images;
calculating an image similarity of each of the N images based on the hamming distances; and
removing, in response to the user selection, a similar image from the N images, wherein the similar image comprises one or more images with the image similarity greater than a preset hamming distance threshold.

12. A terminal, comprising:
a processor; and
a memory coupled to the processor, wherein the memory is configured to store a computer-executable instruction, wherein the processor and the memory are connected using a bus, and when the terminal runs, the processor executes the computer-executable instruction stored in the memory, so that the terminal performs the following steps:
aggregating N images in a gallery based on a first dimension, wherein the first dimension comprises a photographing time or a photographing location, and wherein N>1;
receiving a user selection of a target image for retaining from the N images;
removing, in response to the user selection, a first image from the N images to obtain a story album comprising M images, wherein the first image conflicts with a characteristic of the target image, and wherein the first image comprises an image with an invalid label or one or more images with an image similarity greater than a threshold;
after removing the first image from the N images to obtain the story album comprising the M images, determining, based on a second dimension, a theme associated with the M images to obtain the theme of the story album, wherein the second dimension comprises an image feature of at least one of the M images;
after determining, based on the second dimension, the theme associated with the M images to obtain the theme of the story album, modifying the theme of the story album based on a third dimension, wherein the third dimension comprises association information that is in a target application and that is associated with the theme of the story album; and
displaying an album cover of the story album, wherein the M images are associated with the theme of the story album, and wherein M<N.

13. The terminal of claim 12, wherein the theme of the story album comprises at least one of "birthday," "party," "wedding," "sports," "graduation," "holiday," "night scene," "local travel," or "non-local travel".

14. The terminal of claim 12, wherein the album cover comprises a title of the story album, and wherein the title is associated with at least one of the theme of the story album, a photographing time of the N images, or a photographing location of the N images.

15. The terminal of claim 12, wherein determining, based on the second dimension, the theme associated with the M images to obtain the theme of the story album comprises:
   comparing a label distribution status of the M images with a preset label distribution status of each candidate theme; and
   determining a first candidate theme as the theme of the story album when the label distribution status of the M images meets a label distribution status of a first candidate theme.

16. The terminal of claim 12, wherein the first dimension comprises the photographing time, wherein aggregating the N images in the gallery based on the first dimension comprise aggregating images generated within each of Z time periods into one image set to obtain Z image sets, wherein the Z image sets are in a one-to-one correspondence with the Z time periods, wherein Z≥2, and wherein when a time interval between adjacent image sets is less than an interval threshold, aggregating the adjacent image sets.

17. The terminal of claim 16, wherein the first dimension further comprises the photographing location, and wherein when a photographing location of adjacent image sets is not a preset location, the interval threshold is a first preset value, or when a photographing location of adjacent image sets is a preset location, the interval threshold is a second preset value, wherein the second preset value is less than the first preset value.

18. The terminal of claim 12, wherein the terminal further performs:
   applying a hashing algorithm to the N images to obtain hamming distances between the N images;
   calculating an image similarity of each of the N images based on the hamming distances; and
   removing, in response to the user selection, a similar image from the N images, wherein the similar image comprises one or more images with the image similarity greater than a preset hamming distance threshold.

* * * * *